United States Patent
Kang et al.

(10) Patent No.: US 11,546,925 B2
(45) Date of Patent: Jan. 3, 2023

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 17/264,794

(22) PCT Filed: Aug. 1, 2019

(86) PCT No.: PCT/KR2019/009613
§ 371 (c)(1),
(2) Date: Jan. 29, 2021

(87) PCT Pub. No.: WO2020/027601
PCT Pub. Date: Feb. 6, 2020

(65) Prior Publication Data
US 2021/0298038 A1    Sep. 23, 2021

(30) Foreign Application Priority Data

Aug. 1, 2018  (KR) .................. 10-2018-0089718
Aug. 1, 2018  (KR) .................. 10-2018-0090015

(51) Int. Cl.
*H04W 72/12*     (2009.01)
*H04L 5/00*      (2006.01)
(Continued)

(52) U.S. Cl.
CPC ....... *H04W 72/1226* (2013.01); *H04L 5/0098* (2013.01); *H04W 24/10* (2013.01); *H04W 72/0453* (2013.01); *H04W 72/1268* (2013.01)

(58) Field of Classification Search
CPC ............. H04W 72/12; H04W 72/1205; H04W 72/1226; H04W 72/1263; H04W 72/1268;
(Continued)

(56) References Cited

U.S. PATENT DOCUMENTS 11,190,255 B2 * 11/2021 Zhou ................... H04L 5/0023
2019/0058517 A1 * 2/2019 Kang .................. H04B 7/0456
(Continued)

FOREIGN PATENT DOCUMENTS

| CN | Wo2019/099817 | * | 5/2019 | ............... H04L 5/00 |
| CN | WO2020015679 | * | 1/2020 | ............... H04L 5/00 |
| WO | 2018128410 |   | 7/2018 | |

OTHER PUBLICATIONS

MediaTek Inc., "Summary of Bandwidth Part Remaining Issues," 3GPP TSG-RAN WG1 #92bis, R1-1807667, May 2018, 24 pages.
(Continued)

*Primary Examiner* — Warner Wong
(74) *Attorney, Agent, or Firm* — Lee Hong Degerman Kang Waimey

(57) ABSTRACT

Disclosed is a method for transmitting and receiving channel state information (CSI) in a wireless communication system, and an apparatus therefor. Specifically, in a method for reporting channel state information (CSI) by a user equipment (UE) in a wireless communication system, a plurality of BWPs are configured for the UE, and the plurality of BWPs include an activated first BWP and an inactivated second BWP, wherein the method may comprise the steps of: receiving, from a base station, information related to CSI for the second BWP on the first BWP; receiving a reference
(Continued)

US 11,546,925 B2

Page 2 signal from the base station on the second BWP; performing a measurement on the basis of the reference signal; and transmitting, to the base station, CSI obtained on the basis of the measurement on the first BWP.

13 Claims, 10 Drawing Sheets

(51) Int. Cl.
*H04W 24/10* (2009.01)
*H04W 72/04* (2009.01)

(58) Field of Classification Search
CPC ..... H04W 24/00; H04W 24/10; H04W 72/04; H04W 72/044; H04W 72/0453; H04L 5/0091; H04L 5/0096; H04L 5/0098; H04L 1/0687; H04L 1/0693; H04L 41/0896; H04L 2012/6456
See application file for complete search history.

(56) References Cited

U.S. PATENT DOCUMENTS

| | | | | |
|---|---|---|---|---|
| 2019/0103954 A1* | 4/2019 | Lee | ...................... | H04W 72/042 |
| 2019/0141546 A1* | 5/2019 | Zhou | ................. | H04W 72/1294 |
| 2019/0149305 A1* | 5/2019 | Zhou | ...................... | H04L 1/0026 370/330 |
| 2019/0207662 A1* | 7/2019 | Zhou | ...................... | H04L 5/0048 |
| 2019/0215130 A1* | 7/2019 | Aiba | ...................... | H04L 5/0057 |
| 2019/0364546 A1* | 11/2019 | Kwak | ................... | H04L 5/0044 |
| 2020/0228282 A1* | 7/2020 | Kwak | ................... | H04L 5/0057 |
| 2020/0358540 A1* | 11/2020 | Yokomakura | ........ | H04B 7/0626 |
| 2020/0366407 A1* | 11/2020 | Lnu | ........................ | H04L 1/0026 |
| 2020/0404690 A1* | 12/2020 | Lee | ........................ | H04W 24/10 |
| 2021/0203393 A1* | 7/2021 | Chung | ................. | H04B 7/0417 |
| 2022/0159523 A1* | 5/2022 | Xu | ...................... | H04W 72/085 |

OTHER PUBLICATIONS

Interdigital, Inc., "BWP switching triggering CSI report and cross BWP scheduling," 3GPP TSG-RAN WG1 #92, R1-1802572, Feb. 2018, 4 pages.

Interdigital, Inc., "Remaining issues on dynamic BWP switching," 3GPP TSG-RAN WG1 #93, R1-1806964, May 2018, 3 pages.

Nokia, "On remaining details of BWPs," 3GPP TSG-RAN WG1 #93, R1-1806143, May 2018, 6 pages.

PCT International Application No. PCT/KR2019/009613, International Search Report dated Nov. 26, 2019, 4 pages.

* cited by examiner

[FIG. 1]
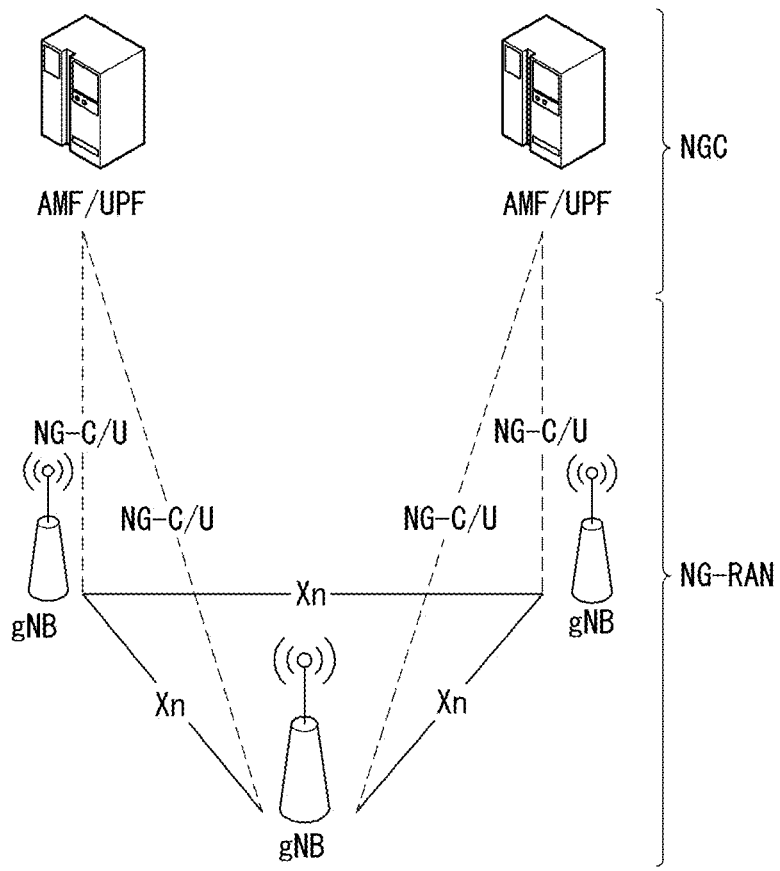
[FIG. 2]
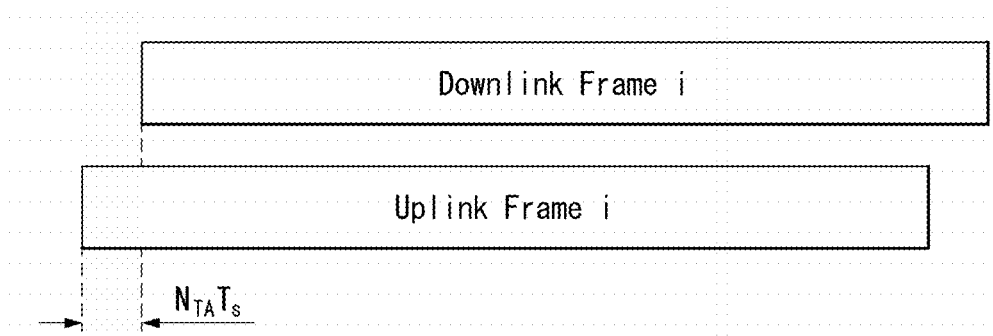

[FIG. 3]
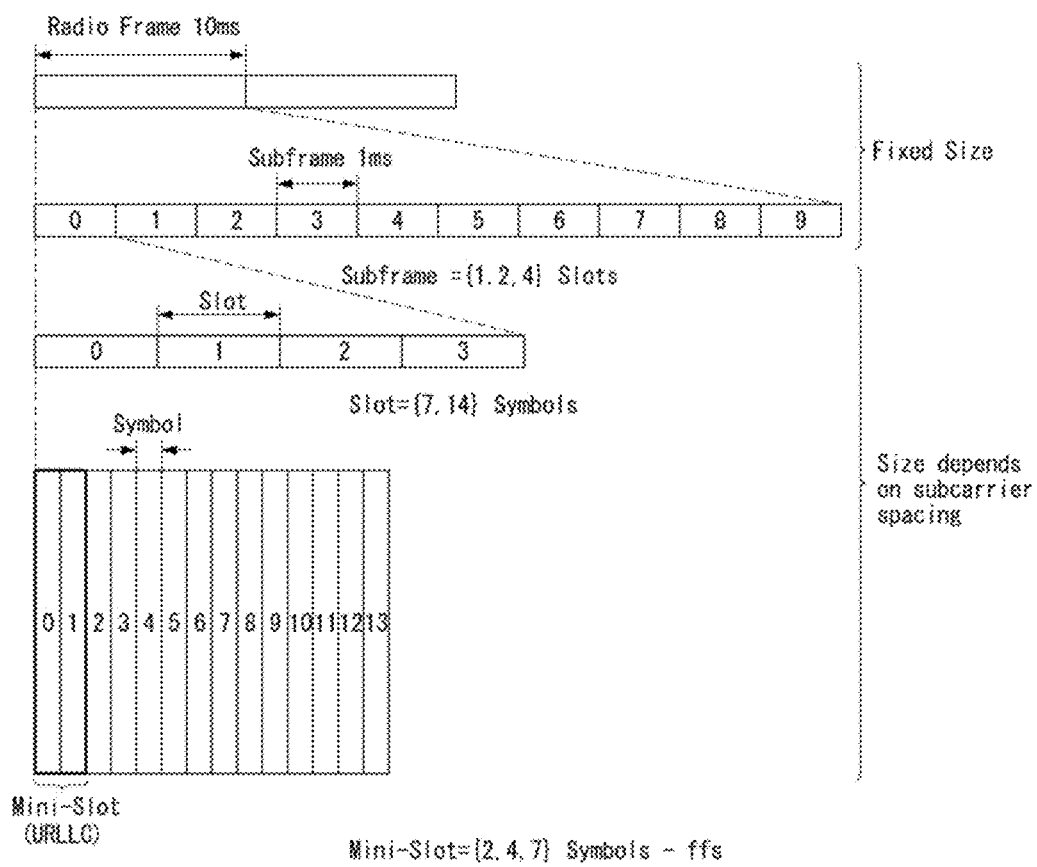

[FIG. 4]
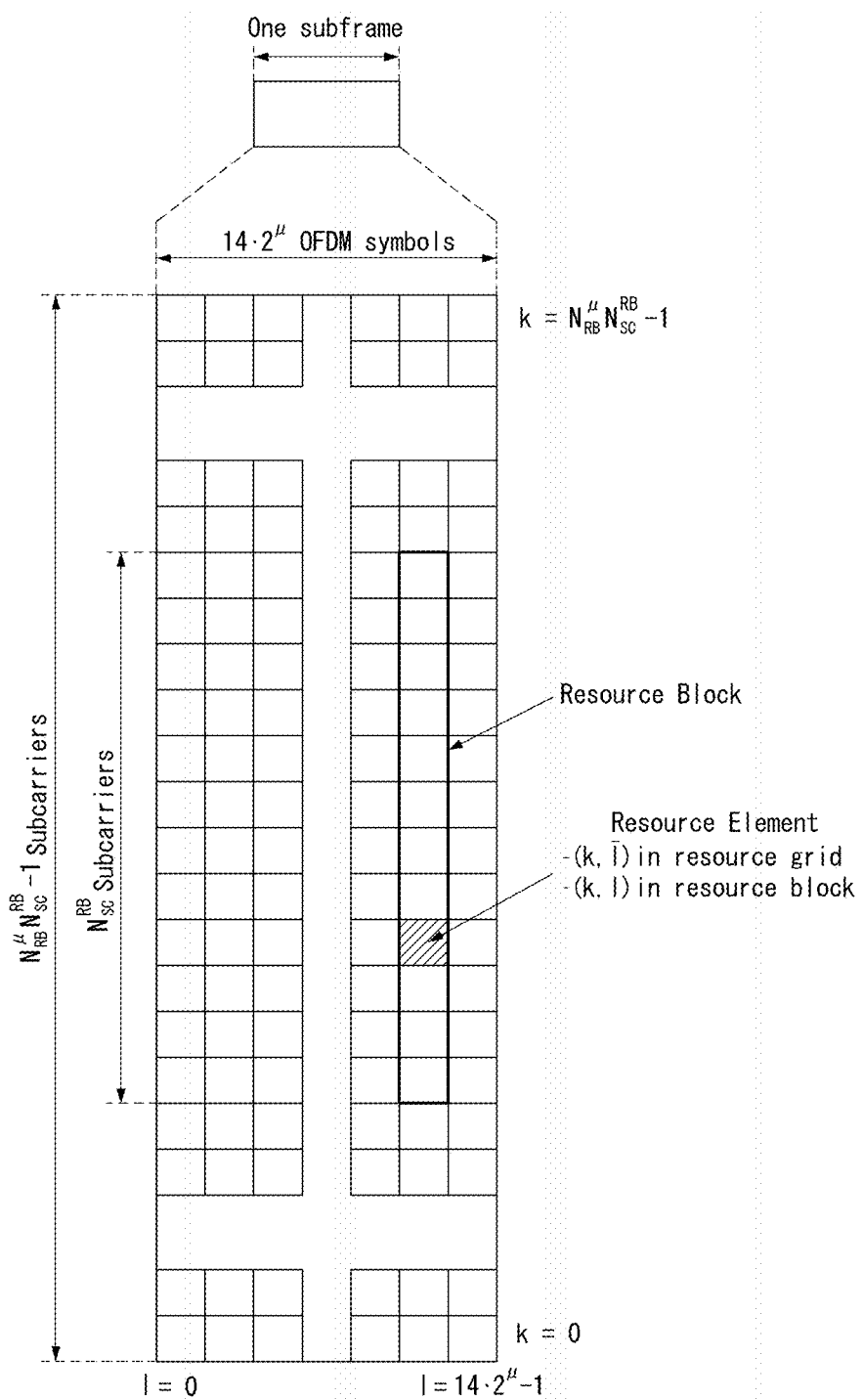

[FIG. 5]
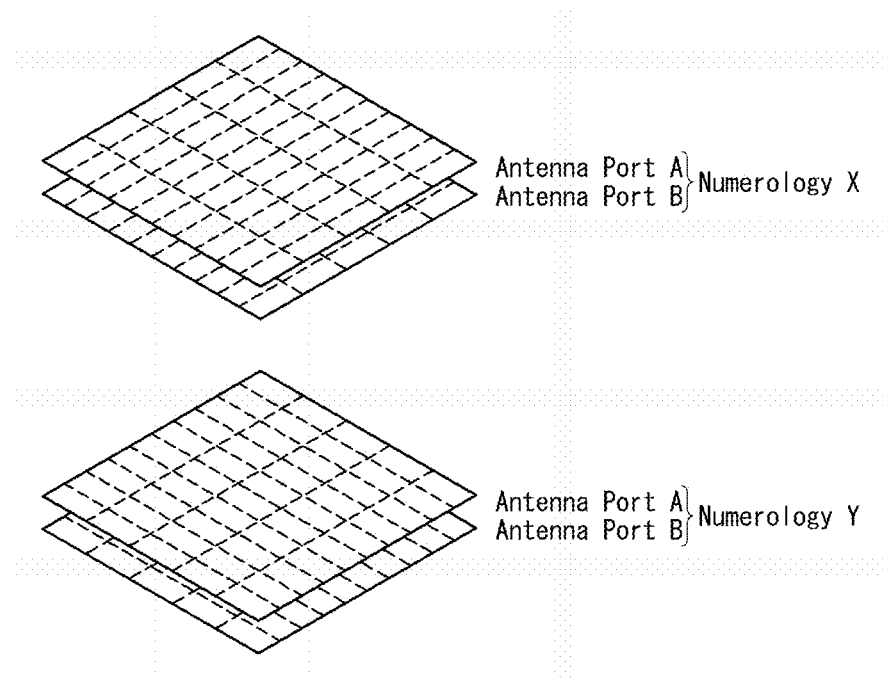
[FIG. 6]
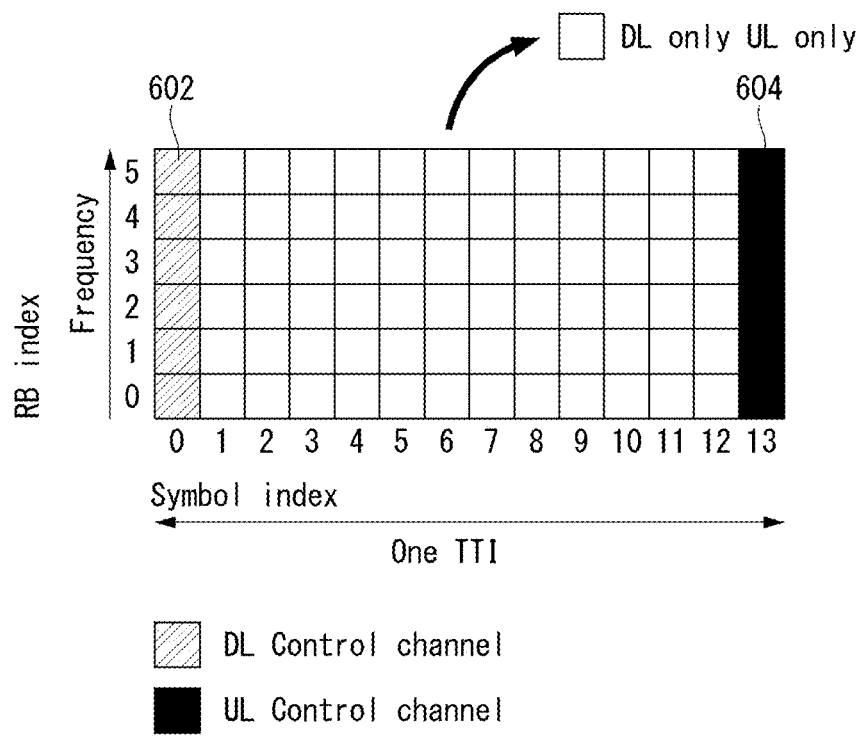

[FIG. 7]
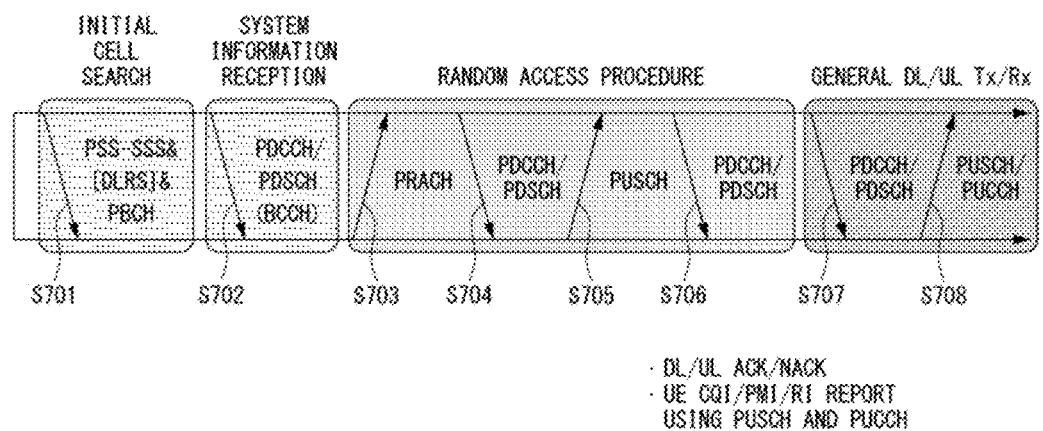
[FIG. 8]
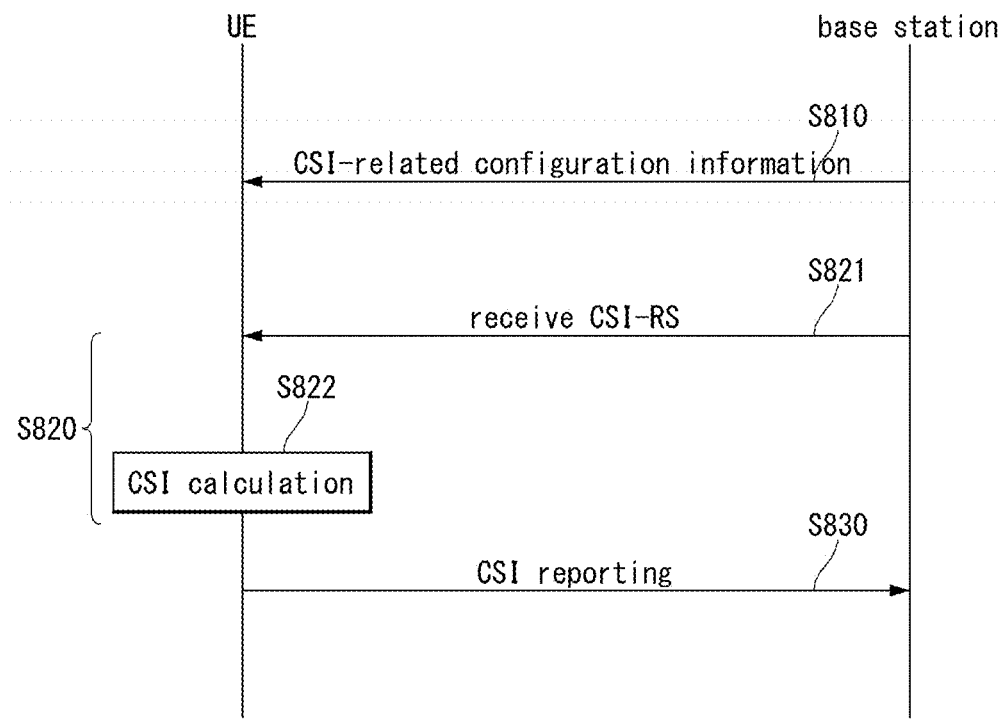

[FIG. 9]
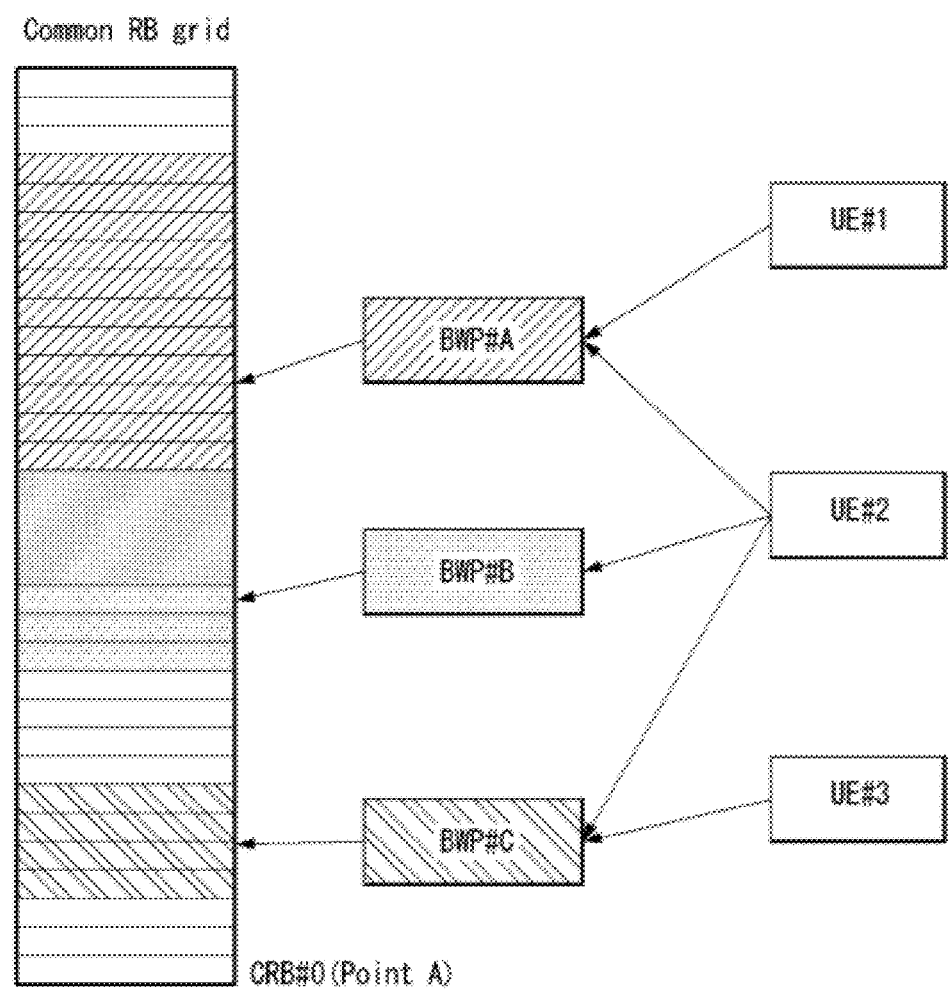

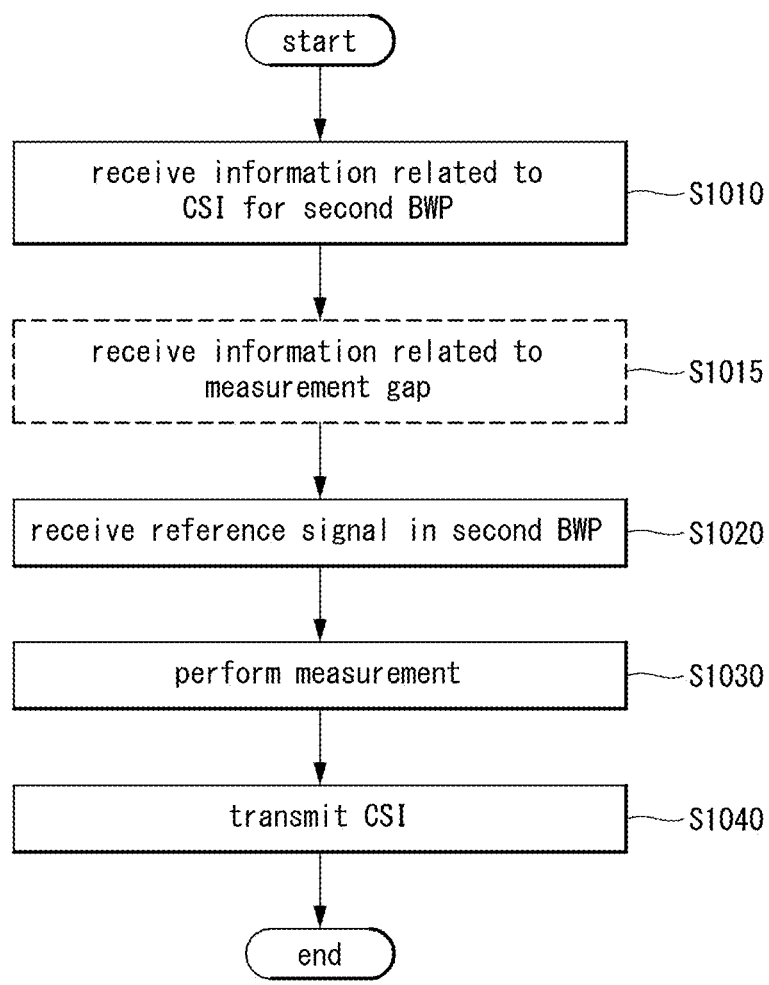
[FIG. 10]

[FIG. 11]
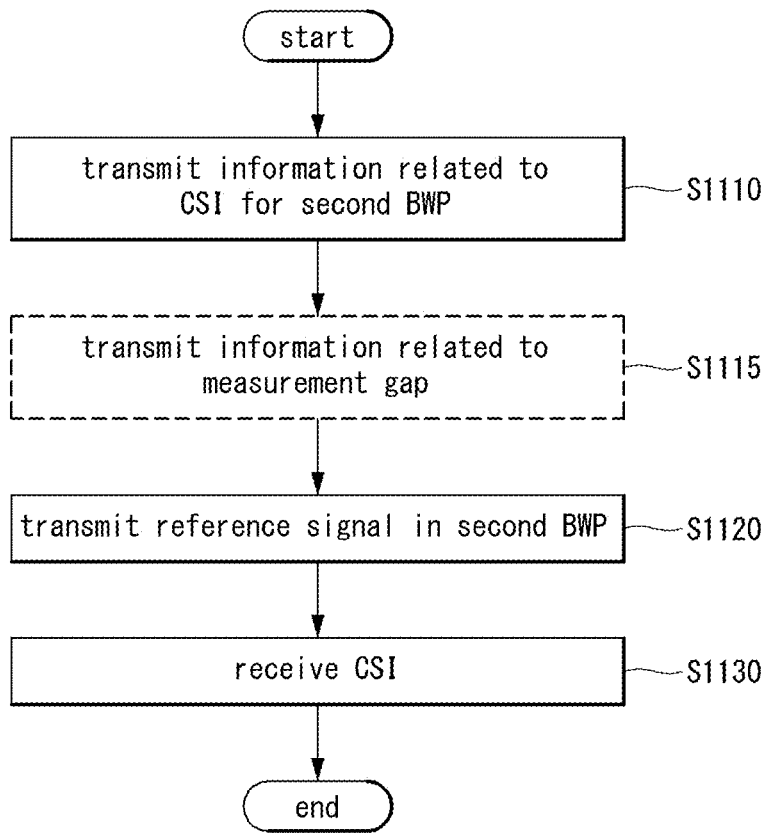
[FIG. 12]
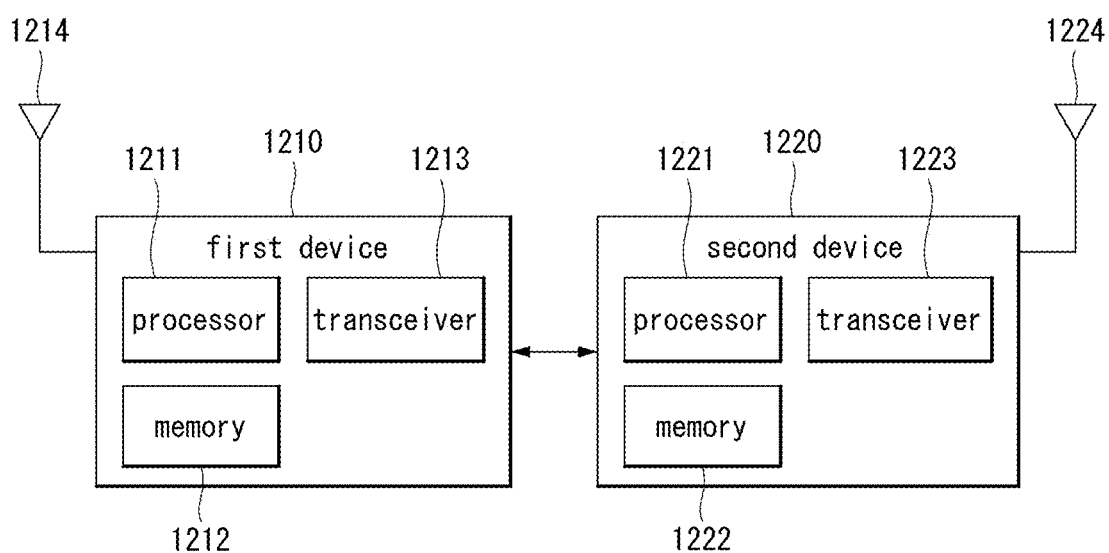

[FIG. 13]
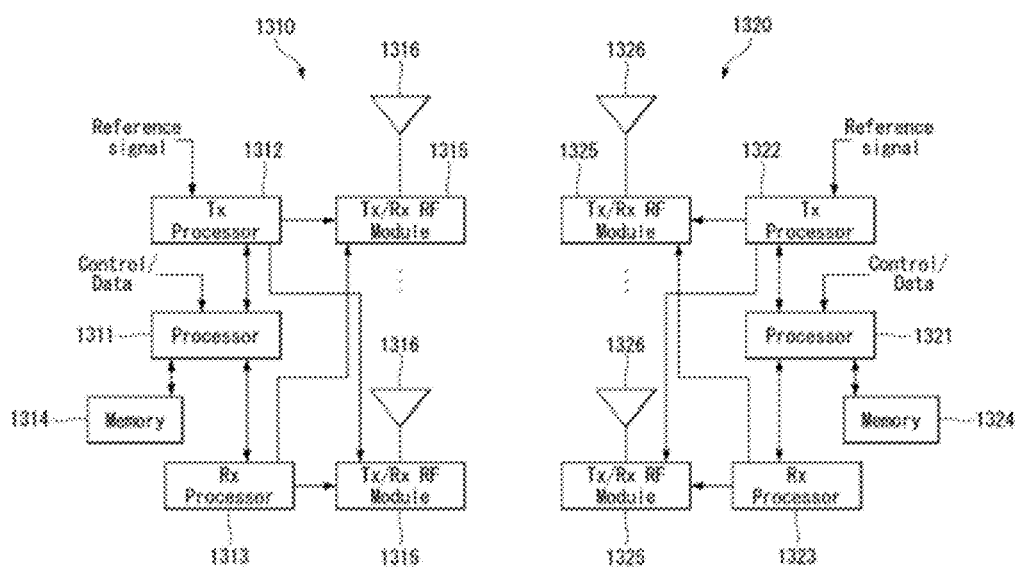
[FIG. 14]
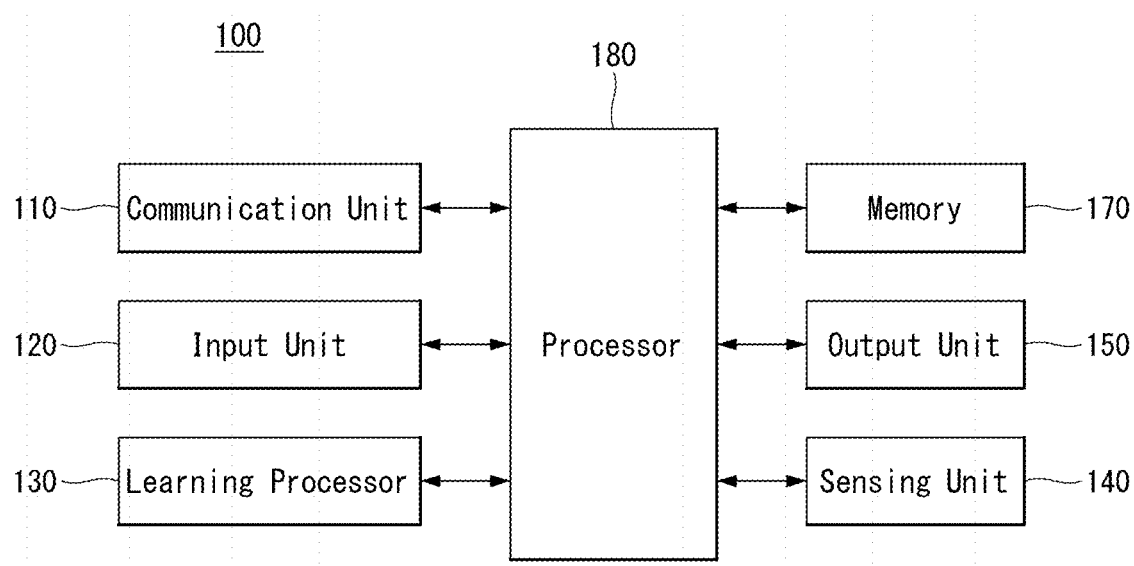

[FIG. 15]
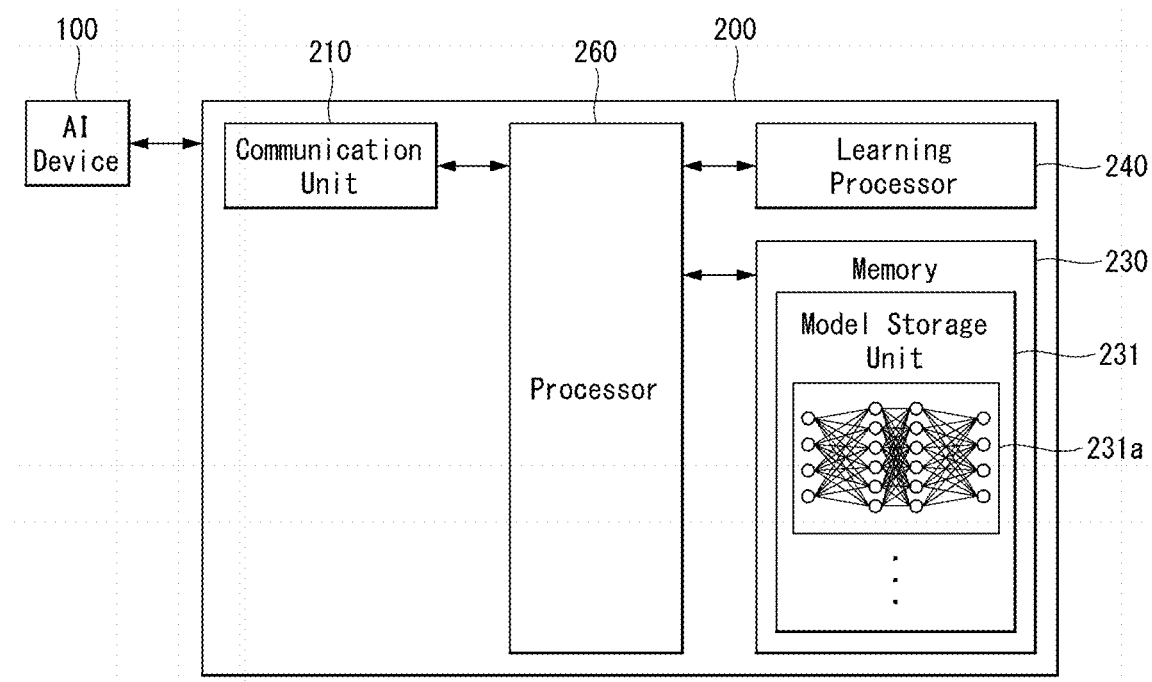
[FIG. 16]
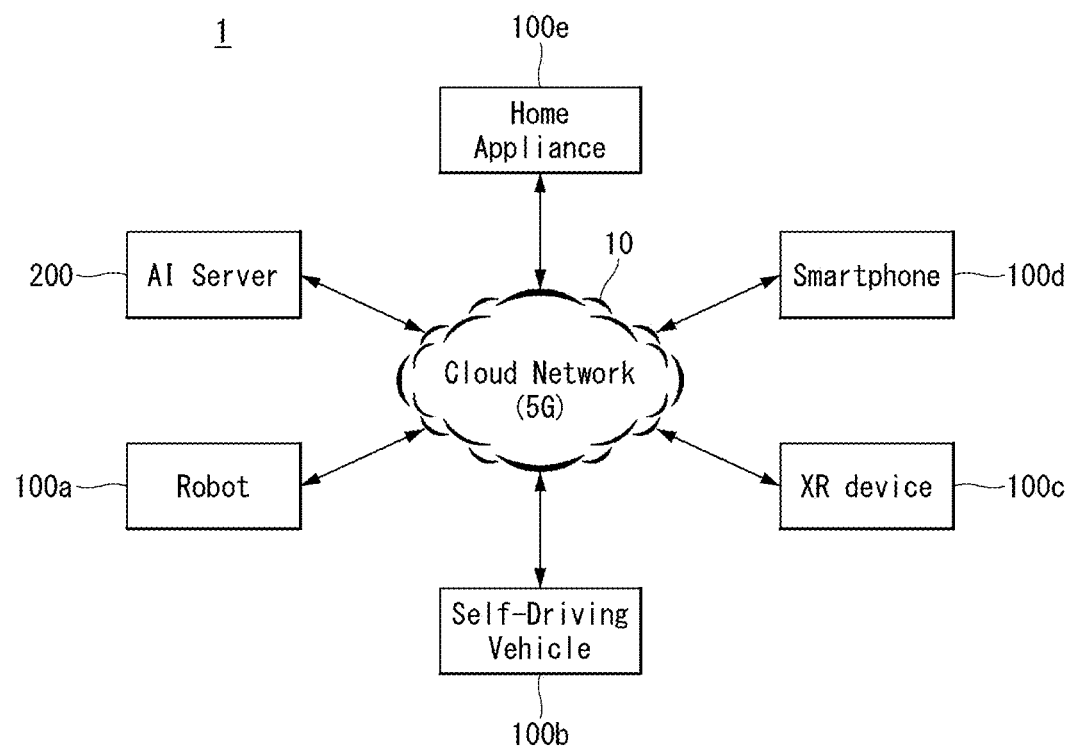

METHOD FOR TRANSMITTING AND RECEIVING CHANNEL STATE INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2019/009613, filed on Aug. 1, 2019, which claims the benefit of KR Application Nos. 10-2018-0089718, filed on Aug. 1, 2018 and 10-2018-0090015, filed on Aug. 1, 2018, the contents of which are all hereby incorporated by reference herein in their entireties.

TECHNICAL FIELD

The disclosure relates to a wireless communication system, and more specifically, to a method for efficiently communicating channel state information for a plurality of bandwidth parts and apparatus for supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

Proposed in the disclosure is a method for efficiently reporting channel state information for a plurality of downlink BWPs in a method for transmitting and receiving channel state information in a wireless communication system.

Specifically, the disclosure proposes a method of monitoring CSI for an inactive BWP without BWP switching by transmitting information indicating CSI measurement and/or reporting for an inactive downlink BWP, in an active BWP.

The disclosure also proposes a method of setting a measurement gap along with indicating CSI measurement and/or reporting for an inactive downlink BWP.

Technical problems to be solved by the disclosure are not limited by the above-mentioned technical problems, and other technical problems which are not mentioned above may be clearly understood from the following description by those skilled in the art to which the disclosure pertains.

Technical Solution

According to embodiments of the disclosure, a method for reporting channel state information (CSI) by a user equipment (UE) in a wireless communication system, wherein a plurality of BWPs are configured to the UE, and the plurality of BWPs include an activated first BWP and a deactivated second BWP, may comprise receiving, from a base station, information related to the CSI for the second BWP in the first BWP, receiving, from the base station, a reference signal in the second BWP, performing measurement based on the reference signal, and transmitting, to the base station, the CSI obtained based on the measurement in the first BWP.

Further, in the method according to an embodiment of the disclosure, when a reporting periodicity of the CSI is set to aperiodic or semi-persistent, the information related to the CSI for the second BWP may be included in any one of an MAC-CE or DCI triggering CSI reporting in the first BWP.

Further, in the method according to embodiments of the disclosure, the information related to the CSI for the second BWP may include information indicating one of i) CSI measurement on all of the plurality of BWPs or 2) CSI measurement on the activated first BWP.

Further, in the method according to an embodiment of the disclosure, the information related to the CSI for the second BWP may include information indicating at least one of CSI measurement and CSI reporting.

Further, in the method according to an embodiment of the disclosure, an indicator for the CSI measurement and an indicator for the CSI reporting may exist independently from each other.

Further, in the method according to an embodiment of the disclosure, the information related to the CSI for the second BWP may be included in a reporting setting.

Further, in the method according to an embodiment of the disclosure, the reporting setting may be configured as one reporting setting obtained by combining respective reporting settings of the plurality of BWPs.

Further, the method according to embodiments of the disclosure may further comprise receiving information related to a measurement gap from the base station.

Further, in the method according to an embodiment of the disclosure, the information related to the measurement gap may include information for a start timing, duration, and periodicity of a measurement gap.

Further, in the method according to an embodiment of the disclosure, the measurement may be performed only when the reference signal is received in an area where a measurement gap set based on the measurement gap-related information overlaps the second BWP.

Further, in the method according to an embodiment of the disclosure, a measurement gap set based on the measurement gap-related information may be set to any one periodicity of periodic, aperiodic, or semi-persistent.

According to embodiments of the disclosure, a UE reporting CSI in a wireless communication system, wherein a plurality of BWPs are configured in the UE, and the plurality of BWPs include an activated first BWP and a deactivated second BWP, may comprise a transceiver for transmitting or receiving a radio signal, and a processor functionally connected with the transceiver. The processor may control the transceiver to receive, from a base station, information related to the CSI for the second BWP in the first BWP, control the transceiver to receive, from the base station, a reference signal in the second BWP, perform measurement based on the reference signal, and control the transceiver to transmit, to the base station, CSI obtained based on the measurement in the first BWP.

Further, in the UE according to an embodiment of the disclosure, when a reporting periodicity of the CSI is set to aperiodic or semi-persistent, the information related to the CSI for the second BWP may be included in any one of an MAC-CE or DCI triggering CSI reporting in the first BWP.

Further, in the UE according to an embodiment of the disclosure, the information related to the CSI for the second BWP may include information indicating at least one of CSI measurement and CSI reporting.

According to embodiments of the disclosure, a base station receiving CSI in a wireless communication system may comprise a transceiver transmitting or receiving a wireless signal, and a processor functionally connected with the transceiver. The processor may configure a plurality of BWPs configured in a UE, the plurality of BWPs including an activated first BWP and a deactivated second BWP, control the transceiver to transmit, to the UE, information related to the CSI for the second BWP in the first BWP, control the transceiver to transmit, to the UE, a reference signal in the second BWP, and control the transceiver to receive, from the UE, CSI obtained based on the reference signal in the first BWP.

Advantageous Effects

According to an embodiment of the disclosure, when monitoring a channel state for a plurality of downlink BWPs, channel state information for an inactive BWP may be reported to the base station without performing BWP switching.

Further, according to an embodiment of the disclosure, channel state information for a plurality of BWPs (active BWP and inactive BWP) may be fed back in one CSI report.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall structure of an NR system to which a method proposed in the disclosure may be applied.

FIG. 2 illustrates the relation between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates one example of a self-contained structure to which a method proposed in the disclosure may be applied.

FIG. 7 illustrates an example of physical channels and general signal transmission used in a 3GPP system.

FIG. 8 illustrates an example uplink transmission/reception operation.

FIG. 9 illustrates an example in which a plurality of bandwidth parts (BWP) are set.

FIG. 10 is a flowchart illustrating example operations of a UE transmitting CSI in a wireless communication system to which a method proposed in the disclosure may be applied.

FIG. 11 is a flowchart illustrating example operations of a base station receiving CSI in a wireless communication system to which a method proposed in the disclosure may be applied.

FIG. 12 illustrates an example of a block diagram of a wireless communication device to which methods proposed in the disclosure may be applied.

FIG. 13 illustrates another example of a block diagram of a wireless communication device to which methods proposed in the disclosure may be applied.

FIG. 14 illustrates an AI device 100 according to an embodiment of the disclosure.

FIG. 15 illustrates an AI server 200 according to an embodiment of the disclosure.

FIG. 16 illustrates an AI system 1 according to an embodiment of the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of system

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or 1). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$ In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates the relation between an uplink frame and a downlink frame in a wireless communication system to which a method proposed in the disclosure may be applied.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology, slots are numbered in increasing order of $n_s^\mu \in \{0, \ldots, N_{subframe}^{slots,\mu} - 1\}$ within a subframe and are numbered in increasing order of $n_{s,f}^\mu \in \{0, \ldots, N_{frame}^{slot,\mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 2

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 3 illustrates an example of a frame structure in a NR system. FIG. 3 is merely for convenience of explanation and does not limit the scope of the disclosure.

In Table 3, in case of $\mu=2$, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure may be applied.

Referring to FIG. 4, a resource grid consists of $N_{RB}^\mu R_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l), where k=0, . . . , $N_{RB}^\mu N_{sc}^{RB} - 1$ is an index on a frequency domain, and l=0, . . . , $2^\mu N_{symb}^{(\mu)} - 1$ refers to a location of a symbol in a subframe. The index pair (k,l) is used to refer to a resource element in a slot, where l=0, ..., $N_{symb}^{\mu}-1$.

The resource element (k,l̄) for the numerology and the antenna port p corresponds to a complex value $a_{k,j}^{(p,\mu)}$. When there is no risk for confusion or when a specific antenna port or numerology is not specified, the indexes p and μ may be dropped, and as a result, the complex value may be $a_{k,j}^{(p)}$ or $a_{k,j}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start}, \quad \text{[Equation 2]}$$

Here, $N_{BWP,i}^{start}$ may be the common resource block where the BWP starts relative to the common resource block 0.

Bandwidth Part (BWP)

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., sub-carrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., sub-carrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot. In the NR specification Rel-15, the UE may be configured up to four BWPs for each of DL and UL per CC via RRC.

In an unpaired spectrum, a one-to-one connection relationship between the DL BWP and UL BWP corresponding to the same BWP ID is established, and the connected DL BWP and UL BWP have the same center frequency. In the NR specification Rel-15, the UE may have only one BWP per CC in the active state. That is, among the set maximum 5 BWPs, only one is an active BWP at one moment. One BWP is activated per link (DL/UL/SUL) per cell at a given time. Here, the 'active' state means that normal data transmission/reception, i.e., reception of PDCCH and PDSCH (for DL BWP) and/or transmission of PUCCH and PUSCH (for UL BWP), may be performed. The UE does not need to monitor the radio link quality in the other DL BWPs than the active DL BWP in the primary cell, and does not expect to receive PDCCH, PDSCH or CSI-RS (except CSI-RS for RRM) in the other DL BWPs than the active DL BWP. Further, it is not expected that the CSI report will be triggered in the inactive DL BWP. The UE does not expect PUCCH or PUSCH to be transmitted outside the active UL BWP.

That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer. In this case, the activated DL/UL BWP is defined as an active DL/UL BWP.

When a plurality of BWPs are configured via RRC, the active BWP may instruct the base station to dynamically switch through DCI. Specifically, it is possible to dynamically indicate/change the UL BWP to perform PUSCH transmission using the BWP indicator field included in DCI format 0_1 and to dynamically indicate/change the DL BWP to perform PDSCH reception using the BWP indicator field included in DCI format 1_1. For each DCI field, the bit field size is determined based on the active DL BWP through which the PDCCH is transmitted, and may be interpreted based on the BWP indicated by each DCI. In addition to the DCI-based BWP switching method, it is possible to automatically switch (or fall back) to the default BWP when there is no action for a certain period of time while transmitting and receiving data in a BWP other than the default BWP based on the BWP inactivity timer.

However, if a terminal is in an initial access process or in a situation before an RRC connection is set up, the terminal may not receive a configuration for a DL/UL BWP. In such a situation, a DL/UL BWP assumed by the terminal is defined as an initial active DL/UL BWP. Initial active DL BWP refers to a frequency band, location, SCS, or CP length set or specified for a control resource set (CORESET) in which a Type0-PDCCH common search space exists. The initial active UL BWP is separately configured via an RRC message. In addition to the initial DL/UL BWP, a default DL/UL BWP may be configured separately (the default BWP corresponds to the initial BWP unless set otherwise).

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

FIG. 6 shows an example of a self-contained structure according to some implementations of this disclosure. FIG. 6 is merely for convenience of description and does not limit the scope of the disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

Physical Channel and General Signal Transmission

FIG. 7 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information transmitted by the UE to the base station or received by the UE from the base station through the uplink may include a downlink/uplink ACK/NACK signal, a channel quality indicator (CQI), a precoding matrix index (PMI), a rank indicator (RI).), etc. The UE may transmit control information, such as CQI/PMI/RI described above, through PUSCH and/or PUCCH.

The downlink (DL) physical layer signals of the 3GPP NR system are as follows.

CSI-RS: Signal for DL channel state information (CSI) acquisition and DL beam measurement TRS (tracking RS): a signal for fine time/frequency tracking of the UE DL DMRS: Signal for PDSCH demodulation DL PT-RS (phase-tracking RS): signal transmitted for phase noise compensation of the UE SSB (synchronization signal block): refers to a resource block consisting of a specific number of consecutive symbols and resource blocks on the time/frequency side consisting of primary synchronization signal (PSS), secondary SS and PBCH (including PBCH DMRS) (the same beam is applied to the signals within one SSB)

The UL (uplink) physical layer signals of the 3GPP NR system are as follows.

SRS: Signal for UL CSI (channel state information) acquisition, UL beam measurement, antenna port selection UL DMRS: Signal for PUSCH demodulation UL PT-RS (phase-tracking RS): Signal transmitted for phase noise compensation of the base station Table 4 shows an example of a DCI format in the NR system.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 4, DCI format 0_0 is used for scheduling of the PUSCH in one cell.

Information included in DCI format 0_0 is CRC-scrambled and transmitted by C-RNTI, CS-RNTI, or MCS-C-RNTI. In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI. DCI format 1_0 is used for scheduling of the PDSCH in one DL cell. Information included in DCI format 1_0 is CRC-scrambled and transmitted by C-RNTI, CS-RNTI, or MCS-C-RNTI. DCI format 1_1 is used for scheduling of the PDSCH in one cell. Information included in DCI format 1_1 is CRC-scrambled and transmitted by C-RNTI, CS-RNTI, or MCS-C-RNTI. DCI format 2_1 is used for notifying a group of UEs of the PRB(s) and OFDM symbol(s) which the UE assumes not to transmit under an intention thereof.

Information included in DCI format 2_1 is CRC-scrambled and transmitted by INT-RNTI.

CSI Related Operation

In a New Radio (NR) system, a channel state information-reference signal (CSI-RS) is used for time and/or frequency tracking, CSI computation, layer 1 (L1)-reference signal received power (RSRP) computation, and mobility. The CSI computation is related to CSI acquisition and L1-RSRP computation is related to beam management (BM).

Channel state information (CSI) collectively refers to information that may indicate the quality of a wireless channel (or referred to as a link) formed between the UE and the antenna port.

FIG. 8 is a flowchart showing an example of a CSI associated procedure.

Referring to FIG. 8, in order to perform one of usages of the CSI-RS, a terminal (e.g., user equipment (UE)) receives, from a base station (e.g., general Node B or gNB), configuration information related to the CSI through radio resource control (RRC) signaling (S810).

The configuration information related to the CSI may include at least one of CSI-interference management (IM) resource related information, CSI measurement configuration related information, CSI resource configuration related information, CSI-RS resource related information, or CSI reporting configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information defines a group including at least one of a nonzero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 5 shows an example of NZP CSI-RS resource set IE. As shown in Table 5, parameters (e.g., a BM related "repetition" parameter and a tracking related "trs-Info" parameter) representing the usage may be configured for each NZP CSI-RS resource set.

TABLE 5

```
-- ASN1START
-- TAG-NZP-CSI-RS-RESOURCESET-START
NZP-CSI-RS-ResourceSet ::=     SEQUENCE {
    nzp-CSI-ResourceSetId         NZP-CSI-RS-ResourceSetId,
    nzp-CSI-RS-Resources          SEQUENCE (SIZE (1..maxNrofNZP-CSI-RS-
ResourcesPerSet)) OF NZP-CSI-RS-ResourceId,
    repetition                    ENUMERATED { on, off }
    aperiodicTriggeringOffset     INTEGER(0..4)
    trs-Info                      ENUMERATED {true}
    ...
}
-- TAG-NZP-CSI-RS-RESOURCESET-STOP
-- ASN1STOP
```

In addition, the repetition parameter corresponding to the higher layer parameter corresponds to "CSI-RS-ResourceRep" of L1 parameter.

The CSI reporting configuration related information includes a reportConfigType parameter representing a time domain behavior and a reportQuantity parameter representing a CSI related quantity for reporting. The time domain behavior may be periodic, aperiodic, or semi-persistent.

The CSI reporting configuration related information may be expressed as CSI-ReportConfig IE and Table 6 below shows an example of CSI-ReportConfig IE.

TABLE 6

```
-- ASN1START
-- TAG-CSI-RESOURCECONFIG-START
  CSI-ReportConfig ::=              SEQUENCE {
      reportConfigId                    CSI-ReportConfigId,
      carrier                           ServCellIndex                OPTIONAL, - - Need S
      resourcesForChannelMeasurement    CSI-ResourceConfigId,
      csi-IM-ResourcesForInterference   CSI-ResourceConfigId         OPTIONAL, - - Need R
      nzp-CSI-RS-ResourcesForInterference  CSI-ResourceConfigId      OPTIONAL, - - Need R
      reportConfigType                  CHOICE {
          periodic                          SEQUENCE {
              reportSlotConfig                  CSI-ReportPeriodicityAndOffset,
              pucch-CSI-ResourceList            SEQUENCE (SIZE (1..maxNrofBWPs)) OF PUCCH-CSI-Resource
          },
          semiPersistentOnPUCCH             SEQUENCE {
              reportSlotConfig                  CSI-ReportPeriodicityAndOffset,
              pucch-CSI-ResourceList            SEQUENCE (SIZE (1..maxNrofBWPs)) OF PUCCH-CSI-Resource
          },
          semiPersistentOnPUSCH             SEQUENCE {
              reportSlotConfig                  ENUMERATED {sl5, sl10, sl20, sl40, sl80, sl160, sl320},
              reportSlotOffsetList              SEQUENCE (SIZE (1.. maxNrofUL-Allocations)) OF INTEGER(0..32),
              p0alpha                           P0-PUSCH-AlphaSetId
          },
          aperiodic                         SEQUENCE {
              reportSlotOffsetList              SEQUENCE (SIZE (1..maxNrofUL-Allocations)) OF INTEGER(0..32)
          }
      },
      reportQuantity                    CHOICE {
          none                              NULL,
          cri-RI-PMI-CQI                    NULL,
          cri-RI-i1                         NULL,
          cri-RI-i1-CQI                     SEQUENCE {
              pdsch-BundleSizeForCSI            ENUMERATED {n2, n4}        OPTIONAL
          },
          cri-RI-CQI                        NULL,
          cri-RSRP                          NULL,
          ssb-Index-RSRP                    NULL,
          cri-RI-LI-PMI-CQI                 NULL
      },
```

The UE measures CSI based on configuration information related to the CSI (S820). The CSI measurement may include (1) a CSI-RS reception process (S821) and (2) a process of computing the CSI through the received CSI-RS (S822). And, detailed descriptions thereof will be described later.

For the CSI-RS, resource element (RE) mapping is configured time and frequency domains by higher layer parameter CSI-RS-ResourceMapping.

Table 7 shows an example of CSI-RS-ResourceMapping IE.

TABLE 7

```
-- ASN1START
-- TAG-CSI-RS-RESOURCEMAPPING-START
  CSI-RS-ResourceMapping ::=        SEQUENCE {
      frequencyDomainAllocation         CHOICE {
          row1                              BIT STRING (SIZE (4)),
          row2                              BIT STRING (SIZE (12)),
          row4                              BIT STRING (SIZE (3)),
          other                             BIT STRING (SIZE (6))
      },
      nrofPorts                         ENUMERATED {p1,p2,p4,p8,p12,p16,p24,p32},
      firstOFDMSymbolInTimeDomain       INTEGER (0..13),
      firstOFDMSymbolInTimeDomain2      INTEGER (2..12)
      cdm-Type                          ENUMERATED {noCDM, fd-CDM2, cdm4-FD2-TD2, cdm8-FD2-TD4},
      density                           CHOICE {
          dot5                              ENUMERATED {evenPRBs, oddPRBs},
          one                               NULL,
```

TABLE 7-continued

|  |  |
|---|---|
| three | NULL, |
| spare | NULL |
| }, | |
| freqBand | CSI-FrequencyOccupation, |
| ... | |
| } | |

In Table 7, a density (D) represents a density of the CSI-RS resource measured in RE/port/physical resource block (PRB) and nrofPorts represents the number of antenna ports.

The UE reports the measured CSI to the eNB (S830).

Here, in the case where a quantity of CSI-ReportConfig of Table 7 is configured to "none (or No report)", the UE may skip the report.

However, even in the case where the quantity is configured to "none (or No report)", the UE may report the measured CSI to the eNB.

The case where the quantity is configured to "none (or No report)" is a case of triggering aperiodic TRS or a case where repetition is configured.

Here, only in a case where the repetition is configured to "ON", the UE may be skip the report.

CSI Measurement

The NR system supports more flexible and dynamic CSI measurement and reporting. The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting "CSI-ResourceConfig" includes a configuration for S≥1 CSI resource set (given by higher layer parameter csi-RS-ResourceSetList). Here, the CSI resource setting corresponds to the CSI-RS-resource-setlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to "1" with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConFIG.

When the UE is configured as multiple CSI-ResourceConfigs including the same CSI-IM resource ID, the same time domain behavior is configured with respect to CSI-ResourceConFIG.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are "QCL-TypeD" for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP. Further, since a different base station transmission beam may be applied for each synchronization signal block (SSB), one or more SSB ID(s) may be included as feedback information for the purpose of reporting an optimal beam ID by the UE. Further, it is under discussion to introduce new feedback information, such as L1-RSRQ (RS received quality) or L1-SINR (signal to interference plus noise ratio), which is the beam quality considering interference.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConFIG.

In addition, the time domain behavior of CSI reporting supports periodic, semi-persistent, and aperiodic.

The periodic CSI reporting is performed on short PUCCH and long PUCCH. The periodicity and slot offset of the periodic CSI reporting may be configured through RRC and refer to the CSI-ReportConfig IE. PUCCH resources to perform CSI reporting may also be configured via RRC. When a plurality of UL BWPs are configured, PUCCH resources for each UL BWP may be allocated. The UE may periodically perform reporting after RRC configuration is completed.

SP CSI reporting is performed on short PUCCH, long PUCCH, or PUSCH.

In the case of SP CSI on the short/long PUCCH, the periodicity and the slot offset are configured as the RRC and the CSI reporting to separate MAC CE/DCI is activated/deactivated. PUCCH resources to perform CSI reporting may also be configured via RRC. When a plurality of UL BWPs are configured, PUCCH resources for each UL BWP may be allocated.

In the case of the SP CSI on the PUSCH, the periodicity of the SP CSI reporting is configured through the RRC, but the slot offset is not configured through the RRC and the SP CSI reporting is activated/deactivated by DCI (format 01). Separated RNTI (SP-CSI C-RNTI) is used with respect to the SP CSI reporting on the PUSCH.

An initial CSI reporting timing follows a PUSCH time domain allocation value indicated in the DCI and a subsequent CSI reporting timing follows a periodicity configured through the RRC.

DCI format 0_1 may include a CSI request field and may activate/deactivate a specific configured SP-CSI trigger state. SP CSI reporting has activation/deactivation which is the same as or similar to a mechanism having data transmission on SPS PUSCH. The PUSCH resource where CSI reporting is to be performed may be indicated by DCI, and BWP information may also be included.

iii) aperiodic CSI reporting is performed on a PUSCH and triggered by DCI. In this case, information related to trigger of aperiodic CSI reporting may be transferred/instructed/configured through MAC-CE.

In the case of AP CSI having an AP CSI-RS, AP CSI-RS timing is set by RRC, and timing for AP CSI reporting is dynamically controlled by DCI. The PUSCH resource where CSI reporting is to be performed may be indicated by DCI, and BWP information may also be included.

The NR does not adopt a scheme (for example, transmitting RI, WB PMI/CQI, and SB PMI/CQI in order) of dividing and reporting the CSI in multiple reporting instances applied to PUCCH-based CSI reporting in the LTE. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. The low latency CSI is a WB CSI that includes up to 4 ports Type-I codebook or up to 4-ports non-PMI feedback CSI. The high latency CSI refers to CSI other than the low latency CSI. For a normal UE, (Z, Z') is defined in a unit of OFDM symbols. Here, Z represents a minimum CSI processing time from the reception of the aperiodic CSI triggering DCI to the execution of the CSI reporting. And, Z' represents a minimum CSI processing time from the reception of the CSI-RS for channel/interference to the execution of the CSI reporting.

Additionally, the UE reports the number of CSIs which may be simultaneously calculated.

CSI reporting using PUSCH

Aperiodic CSI reporting performed on PUSCH supports broadband and subband frequency granularity. Aperiodic CSI reporting performed on PUSCH supports type I and type II CSI.

SP CSI reporting for PUSCH supports type I and type II CSI with wide band and subband frequency granularity. PUSCH resources and modulation and coding scheme (MCS) for SP CSI reporting are semi-permanently allocated by UL DCI.

The CSI report for PUSCH may include part 1 and part 2. Part 1 is used to identify the number of bits of the part 2 information. Part 1 is fully delivered before part 2.

Regarding type I CSI feedback, part 1 includes RI (if reported), CRI (if reported), and CQI of the first code word. Part 2 includes PMI, and when RI>4, part 2 includes CQI.

For Type II CSI feedback, part 1 has a fixed payload size and includes an indication (NIND) indicating the number of non-zero broadband amplitude coefficients for each layer of RI, CQI, and type II CSI. Part 2 includes the PMI of type II CSI.

When the CSI report includes two parts in the PUSCH and the CSI payload is smaller than the payload size provided by the PUSCH resource allocated for CSI reporting, the UE may omit a part of the second CSI. Part 2 CSI omission is determined according to priority. Priority 0 is the highest priority, and $2N_{Rep}$ is the lowest priority.

CSI Reporting Using PUCCH

The UE may be configured with a plurality of periodic CSI reports corresponding to the CSI report configuration indication composed of one or more higher layers. Here, the associated CSI measurement link and CSI resource configuration are configured via a higher layer.

Periodic CSI reporting in PUCCH format 2, 3 or 4 supports type I CSI based on a wide bandwidth.

Regarding the SP CSI on the PUSCH, the UE transmits the HARQ-ACK corresponding to the PDSCH carrying the selection command in slot n and then performs SP CSI reporting on the PUCCH in slot $n+3N_{slot}^{subframe,\mu}+1$.

The selection command includes one or more report setting indications where the associated CSI resource setting is configured.

The SP CSI report supports type I CSI in PUCCH.

The SP CSI report of PUCCH format 2 supports type I CSI with wide bandwidth frequency granularity. The SP CSI report of PUCCH format 3 or 4 supports type I sub-band CSI and type II CSI with wide bandwidth granularity.

When PUCCH carries type I CSI with wide bandwidth frequency granularity, the CSI payload carried by PUCCH format 2 and PUCCH format 3 or 4 is the same as CRI (when reported) regardless of RI.

In PUCCH format 3 or 4, the type I CSI subband payload is divided into two parts.

The first part (part 1) includes the RI of the first code word, the (reported) CRI, and the (reported) CQI. PMI is included in the second part (part 2), and when RI>4, the CQI of the second code word is included in the second part (part 2).

SP CSI reporting performed in PUCCH format 3 or 4 supports type II CSI feedback, but only part 1 of type II CSI feedback.

In PUCCH format 3 or 4 supporting type II CSI feedback, CSI reporting may depend on UE performance.

The type II CSI report (only Part 1 of them) delivered in PUCCH format 3 or 4 is calculated independently from the type II CSI report performed on the PUSCH.

When the UE is configured with CSI reporting in PUCCH format 2, 3 or 4, each PUCCH resource is configured for each candidate UL BWP.

When the UE receives the active SP CSI reporting configuration on the PUCCH and does not receive a deactivation command, CSI reporting is performed when the CSI reported BWP is an active BWP, otherwise CSI reporting is temporarily stopped. This operation is also applied in the case of SP CSI of PUCCH. For the PUSCH-based SP CSI report, the CSI report is automatically deactivated when a BWP switch occurs.

Depending on the length of the PUCCH transmission, the PUCCH format may be classified as a short PUCCH or a long PUCCH. PUCCH formats 0 and 2 may be referred to as short PUCCHs, and PUCCH formats 1, 3 and 4 may be referred to as long PUCCHs.

In relation to PUCCH-based CSI reporting, short PUCCH-based CSI reporting and long PUCCH-based CSI reporting are described in detail below.

Short PUCCH-based CSI reporting is used only for wideband CSI reporting. Short PUCCH-based CSI reporting has the same payload regardless of the RI/CRI of a given slot to avoid blind decoding.

The size of the information payload may be different between the maximum CSI-RS ports of the CSI-RS configured in the CSI-RS resource set.

When the payload including PMI and CQI is diversified to include RI/CQI, padding bits are added to RI/CRI/PMI/CQI before the encoding procedure for equalizing payloads associated with other RI/CRI values. Further, RI/CRI/PMI/CQI may be encoded as padding bits as needed.

In the case of broadband reporting, long PUCCH-based CSI reporting may use the same solution as short PUCCH-based CSI reporting.

Long PUCCH-based CSI reporting uses the same payload regardless of RI/CRI. For subband reporting, two-part encoding (for type I) is applied.

Part 1 may have a fixed payload according to the number of ports, CSI type, or RI restrictions, and part 2 may have various payload sizes according to part 1.

CSI/RI may be first encoded to determine the payload of the PMI/CQI. Further, CQIi (i=1, 2) corresponds to the CQI for the i-th code word (CW).

For long PUCCH, type II CSI report may only carry part 1.

For ease of description, the following terms are used throughout the disclosure.

DL: downlink
UL: uplink
BWP: bandwidth part
CSI: channel state information
DCI: downlink control information
SPS: semi-persistent scheduling
RRC: Radio resource control
PDSCH: Physical Downlink Shared channel
PDCCH: Physical Downlink Control channel FIG. 9 illustrates an example in which a plurality of bandwidth parts (BWP) are set.

Referring to FIG. 9, a plurality of BWPs may be configured for one UE, and one BWP may be commonly allocated to several UEs. To efficiently perform dynamic DL BWP switching, the base station needs to acquire the latest DL CSI for the target BWP to be switched. This is because so doing ensures that, while performing DL BWP switching, accurate multi-input multi-output (MIMO) precoding for PDSCH, transmission rank, and DL MCS (modulation & coding scheme) may be determined and transmitted. Accordingly, periodic/semi-persistent/aperiodic CSI measurement and reporting operations for inactive DL BWP need to be supported.

Aperiodic CSI reporting for inactive DL BWP in the NR (New Radio) system may be performed via: 1) changing the DL BWP to the target BWP by scheduling the PDSCH for the target inactive DL BWP via DL DCI; and 2) indicating aperiodic CSI reporting on the PUSCH based on the periodic/semi-persistent/aperiodic CSI-RS transmitted in the target DL BWP via UL DCI.

The semi-persistent CSI reporting on the SPS PUSCH for the inactive DL BWP may be performed via: 1) changing the DL BWP to the target BWP by scheduling the PDSCH for the target inactive BWP via DL DCI; and 2) activating semi-persistent CSI reporting on the PUSCH based on the periodic/semi-persistent CSI-RS transmitted in the target DL BPW, via UL DCI.

The semi-persistent CSI reporting on the PUCCH for the inactive DL BWP may be performed via: 1) changing the DL BWP to the target BWP by scheduling the PDSCH for the target inactive BWP via the DL DCI; and 2) performing semi-persistent CSI reporting on the PUCCH according to a preset CSI reporting period and slot offset from the time of successful completion of MAC-CE reception for semi-persistent CSI reporting activation. Here, the time of successful completion of the MAC-CE reception may mean a predetermined time (e.g., 3 msec) after the UE transmits an ACK on the PDSCH delivering the MAC-CE. Further, the time at which the MAC-CE for activating the semi-persistent CSI reporting is transmitted to the UE may be a time earlier than step 1) (i.e., the step of changing to the target BWP). Or, at a time later than step 1), the MAC-CE for activating the semi-persistent CSI reporting may be transmitted to the UE. Or, the MAC-CE for activating the semi-persistent CSI reporting may be transmitted to the UE at the same time (e.g., indicating the activation MAC-CE through the PDSCH scheduled in step 1).

The periodic CSI reporting on the PUCCH for the inactive DL BWP may be performed via: 1) changing the DL BWP to the target BWP by scheduling the PDSCH for the target inactive BWP via the DL DCI; and 2) performing periodic CSI reporting on the PUCCH according to a preset CSI reporting period and slot offset preset via RRC.

In the above-described CSI reporting operations, it may be assumed that the periodic CSI-RS transmitted in the target BWP is transmitted according to the period and slot offset preset via RRC. The semi-persistent CSI-RS is transmitted in accordance with the period and slot offset preset via RRC, and a process of activating the semi-persistent CSI-RS for the target BWP with MAC-CE is additionally needed. The time at which the MAC-CE for activating the semi-persistent CSI-RS is transmitted to the UE is a time before or after step 1), or the same time (e.g., indicating the activation MAC-CE through the PDSCH scheduled in step 1). The aperiodic CSI-RS may be triggered together with aperiodic CSI reporting.

In the unpaired spectrum (e.g., TDD), since the DL BWP and the UL BWP are configured in a paired relationship, in the reporting processes, step 1) may be replaced with the step of 'changing the DL BWP to the target BWP by scheduling the PUSCH for the UL BWP paired with the target DL BWP, via UL DCI'. In this case, an aperiodic CSI reporting process for the inactive DL BWP may be possible in one step as follows. That is, while changing the DL BWP to the target BWP, aperiodic CSI reporting on the PUSCH may be indicated based on the periodic/semi-persistent/aperiodic CSI-RS transmitted from the target DL BWP by scheduling the PUSCH for the UL BWP paired with the target DL BWP via UL DCI.

In the unpaired spectrum (e.g., TDD), the semi-persistent CSI reporting process may be possible in one step as follows, like above. That is, while changing the DL BWP to the target BWP, semi-persistent CSI reporting on the SPS PUSCH may be activated based on the periodic/semi-persistent CSI-RS transmitted in the target DL BWP by scheduling the SPS PUSCH for the UL BWP paired with the target DL BWP via UL DCI.

A look at the CSI measurement and reporting for the inactive DL BWP described above reveals that to obtain CSI for any DL BWP, a process of changing (switching) the active DL BWP, that is, the BWP receiving the PDCCH, to the corresponding BWP is always needed. In particular, the frequency division duplex (FDD) system always needs the process of unnecessarily scheduling a PDSCH for DL BWP switching. Accordingly, the above-described methods have a disadvantage in that the base station cannot accurately know the CSI of the downlink channel until the reception of the first CSI report is completed after the time of DL BWP switching. Further, since even the activated DL BWP, that is, the BWP for transmitting and receiving the PDCCH, needs to be changed, the above-described methods may not fit the intended purpose of 'CSI monitoring for a downlink channel in an inactive DL BWP'. In particular, to perform CSI monitoring for two or more inactive BWPs, the activated DL BWPs need to be changed one by one while triggering/activating CSI reporting for each DL BWP.

Described below are various methods for performing CSI reporting on the inactive DL BWP(s) without involving the active DL BWP switching process (that is, while maintaining the DL BWP transmitting and receiving the PDCCH) according to the disclosure. The proposed methods as follow are described focusing on the CSI-RS, but this is merely for convenience of description and does not limit the scope of the disclosure. Accordingly, it may be extended and applied to CSI-IM as an interference measurement resource or a synchronization signal block (SSB), as a downlink measurement reference signal resource for downlink beam management. Further, it is assumed herein that the CSI report setting on the PUSCH/PUCCH for the reference signal (e.g., CSI-RS) transmitted in each DL BWP has been completed in the RRC configuration.

<Method 1>

In the case of semi-persistent or aperiodic CSI reporting, a considerable method is to instruct to perform CSI-RS measurement (and corresponding CSI reporting) for inactive BWP(s) via DCI or MAC-CE that triggers/activates CSI reporting. In this case, for the CSI-RS measurement, a semi-persistent or aperiodic measurement gap may be set. The measurement gap period means a period defined to prevent the UE from performing downlink reception and uplink transmission (for active BWPs) (except for some exceptional cases) so as to be able to receive downlink signals in other frequency bands (BWPs, component carriers or bands) (through switching reception bands on the RF end).

For example, DCI (e.g., CSI request field in DCI) triggering/activating CSI reporting or MAC-CE (e.g., CSI reporting activation message within MAC-CE) may include information indicating CSI measurement and/or reporting on the inactive BWP. The UE receiving the information indicating CSI measurement and/or reporting for the inactive BWP from the base station, if the reference signal for CSI measurement is a reference signal transmitted in the inactive DL BWP, may receive a downlink reference signal of the inactive BWP(s) and perform measurement and CSI reporting (with a configuration of a semi-persistent/aperiodic measurement gap).

In this case, a measurement gap may be set for measuring the reference signal.

As an example, an aperiodic measurement gap may be maintained for a certain period of time (duration) from a predetermined time (start timing) after the time when the UE receives the CSI measurement indication (or the time of transmission of an ACK signal for the CSI measurement indication to the base station) and then terminate.

As another example, a semi-persistent measurement gap may last for a certain period of time (duration), from a predetermined time (start timing) after the time when the UE receives the CSI measurement indication (or the time of transmission of an ACK signal for the CSI measurement indication to the base station) and then terminates, then a measurement gap may be set again every certain period (periodicity). As a specific example, the measurement gap may be maintained for predetermined duration from {start time n*P}. Here, n is an integer greater than or equal to 0 (the maximum value of n is determined by the time at which measurement is deactivated), and P denotes the periodicity.

The start timing, duration, and periodicity (in the case of a semi-persistent measurement gap) of the semi-persistent or aperiodic measurement gap may be determined according to one of the following two methods.

Method 1) As an example, the base station may separately set/indicate, to the UE, a start time, duration, and periodicity of a semi-persistent or aperiodic measurement gap. In this case, for more efficient indication, they may be indicated using two-step (e.g., RRC and MAC-CE), or multi-step (e.g., RRC, MAC-CE, and DCI) signaling. For example, a plurality of candidate measurement gap configurations may be set via RRC, and one of the candidates to be actually applied may be indicated via MAC-CE and/or DCI.

Method 2) As another example, the start timing, duration, and periodicity of the semi-persistent or aperiodic measurement gap may be (implicitly) set according to a set/indicated CSI-RS transmission time (timing), duration, and periodicity (for a semi-persistent measurement gap). If CSI reporting for a plurality of CSI-RS resources is indicated, or if a plurality of CSI reports are indicated, they may be set considering the transmission timing, duration, and periodicity of the plurality of CSI-RS resources to be measured.

As a specific example, the periodicity of the measurement gap may be adjusted to the CSI-RS resource having the shortest periodicity among the plurality of CSI-RS resources. Alternatively, the periodicity of the measurement gap may be adjusted to the CSI-RS resource having the longest periodicity among the plurality of CSI-RS resources. Alternatively, the periodicity of the measurement gap may be set as the greatest common divisor of the periodicities of the plurality of CSI-RS resources. Alternatively, the periodicity of the measurement gap may be set to the least common multiple of the periodicities of the plurality of CSI-RS resources.

As another specific example, the start timing of the measurement gap may be set according to the earliest CSI-RS (e.g., the first symbol of the earliest CSI-RS resource) (in the corresponding periodicity). In this case, given the RF tuning time, the measurement gap may be set from a time earlier than the aforementioned timing. For example, the measurement gap may be set from the first symbol of the slot. Alternatively, the measurement gap may be set from some symbols or some slots before the first symbol of the earliest CSI-RS resource. Alternatively, the measurement gap may be set from X msec (milliseconds) before the first symbol of the earliest CSI-RS resource.

As another specific example, the end timing of the measurement gap may be set according to the latest CSI-RS (e.g., the last symbol of the last CSI-RS resource) (in the corresponding periodicity). In this case, given the RF tuning time, the measurement gap may be ended a predetermined time later than the aforementioned timing. As an example, the measurement gap may be maintained until the last symbol of the slot and then terminated. Alternatively, the measurement gap may be terminated several symbols or slots after the last symbol of the last CSI-RS resource. Alternatively, the measurement gap may be terminated X msec after the last symbol of the last CSI-RS resource.

As another specific example, the start and end timings of the measurement gap may be set according to the latest CSI-RS (e.g., the last symbol of the last CSI-RS resource) (in the corresponding periodicity). In this case, given the RF tuning time, the measurement gap may be ended a predetermined time later than the aforementioned timing. As an example, the measurement gap may be maintained until the last symbol of the slot and then terminated. Alternatively, the measurement gap may be terminated several symbols or slots after the last symbol of the last CSI-RS resource.

As another specific example, a measurement gap may be limitedly set in a situation where all CSI-RS resources are transmitted in N consecutive slots. Alternatively, the union of predetermined periods of time, symbols, or slots before and after each CSI-RS resource may be set as a measurement gap. Also possible is a method in which the base station indicates the CSI-RS resource which serves as a reference for the measurement gap.

For semi-persistent or aperiodic CSI reporting on PUSCH, the (initial) start timing of the measurement gap may be limited to a time after the delay time which is the sum of the DCI decoding delay (which triggers CSI reporting for the reference signal in the inactive DL BWP) and the delay required for RF tuning. The delay value may be predefined as a specific value, or may be set by the base station (based on UE capability). Further, if the reference signal to be measured is a semi-persistent CSI-RS, the start timing of the measurement gap may be limited to a time after the sum of the DCI decoding delay (which triggers CSI reporting for the reference signal in the inactive DL BWP) and the delay required for RF tuning and the time of completion of the semi-persistent CSI-RS activation. Here, the time of completion of the semi-persistent CSI-RS activation may mean a timing after a predetermined time (e.g., 3 msec) from a timing when the UE transmits, to the base station, an ACK for the PDSCH delivering the MAC-CE.

For semi-persistent CSI on the PUCCH, the (initial) start timing of the measurement gap may be limited to a time after the semi-persistent CSI report activation is completed. Here, the time of completion of the semi-persistent CSI reporting activation may mean a timing after a predetermined time (e.g., 3 msec) from a timing when the UE transmits an ACK for the PDSCH delivering the MAC-CE. Additionally, when the reference signal to be measured is a semi-persistent CSI-RS, the start timing of the measurement gap may be limited to meeting a time after the time when the semi-persistent CSI reporting activation is completed and the time when the semi-persistent CSI-RS activation is completed.

Some UEs may perform inter-BWP measurement without a measurement gap. Accordingly, the UE may report whether or not a measurement gap is required to the base station. Accordingly, the base station may separately indicate whether to set a measurement gap based on the above-described operations. If no measurement gap is required, the UE receiving an implicit or explicit indication for the measurement gap may perform measurement (and reporting) for the inactive BWP according to the indication and, in this case, the UE may perform normal uplink reception and uplink transmission even during measurement (e.g., the UE may not stop PDCCH monitoring).

A specific embodiment of method 1 is described.

The base station may trigger aperiodic CSI reporting on PUSCH via UL DCI. The UL DCI may include information indicating CSI measurement and reporting for inactive BWP. When the DL BWP ID(s) of the CSI-RS (and/or CSI-IM) associated with the triggered aperiodic CSI report(s) is different from (in whole or part) the DL BWP ID for the PDCCH carrying the UL DCI (that is, in the case of inactive DL BWP(s)), the UE may temporarily set a measurement gap for a certain time period and receive the CSI-RS, and then perform CSI reporting through the PUSCH indicated by UL DCI.

In PUSCH-based CSI reporting, it may be instructed to perform a plurality of CSI reporting through one PUSCH, and accordingly, when the above-described method is applied, CSI-RS reception for a plurality of inactive DL BWPs within a measurement gap may be supported. For example, for three DL BWPs, reporting may be set per BWP, such as CSI report #0 for DL BWP #0, CSI report #1 for DL BWP #1, and CSI report #2 for DL BWP #2. When the currently active BWP is DL BWP #0, it may be instructed to report the CSI report #1 and CSI report #2 together in one PUSCH (by setting the state of a specific CSI request field). Upon receiving the indication, the UE may receive CSI-RSs transmitted in a plurality of DL BWPs within the aperiodic measurement gap (while retuning RF).

One CSI report may be configured for a plurality of CSI-RS resources in the NR system. This is why the base station may separately set the CSI-RS resource transmitted in each TRP/base station/panel when there are a plurality of TRPs/base stations/panels or the base station transmits beamformed CSI-RS while applying different beamforming. A plurality of CSI-RS resources for the one CSI report may be CSI-RSs transmitted in different BWPs. As such, method 2 is proposed under the assumption that one CSI report is configured for a plurality of CSI-RS resources.

<Method 2>

In the case of periodic CSI reporting, no separate triggering/activation indication may be transmitted to the UE. Therefore, in addition to the above-described method of indication by including and transmitting in the DCI or MAC-CE, a method of transmitting a separate indicator may be considered.

The base station may transmit indication information as to whether the UE is supposed to always perform CSI measurement and/or CSI reporting regardless of whether the corresponding BWP where the CSI-RS is received is activated or deactivated, or whether the UE is supposed to perform CSI measurement and/or CSI reporting only in the active BWP. Here, in the indication information, an indicator indicating CSI measurement and an indicator indicating a performing of CSI reporting may independently exist. For example, when the CSI-RS is received in an inactive DL BWP and an uplink resource to perform reporting belongs to an inactive UL BWP, the UE may be instructed to perform only CSI measurement while omitting CSI reporting.

In this case, the base station may transmit information related to the measurement gap to the UE. Through the information related to the measurement gap, at each CSI-RS transmission time, a measurement gap may be automatically set if the BWP where the corresponding CSI-RS is transmitted is an inactive BWP while no measurement gap is set if the BWP is an active BWP. Or, a periodic measurement gap may be always set regardless of whether the BWP is active or inactive.

The indication for CSI measurement and/or CSI reporting may be set through a separate indicator of resource set/setting. (In this case, it may be indicated whether to always perform CSI measurement.) Or, it may be set through a separate indicator of the reporting setting. (In this case, whether to always perform both CSI measurement and CSI reporting or measurement alone may be indicated in the report setting.)

In the case of setting an indication for CSI measurement and/or CSI reporting via reporting setting, the conventional PUCCH-based CSI reporting performs reporting only when the BWP where CSI-RS is received is active, while stopping CSI reporting if the BWP where CSI-RS is received is inactive. However, as per method 2, the base station may instruct to perform CSI reporting (for specific reporting) even when CSI-RS is received in an inactive DL BWP. Since this operation is more suitable for coarse CSI monitoring for each BWP, it may be limited to allowing CSI reporting for the inactive DL BWP when at least one of the following example conditions is met.

Short PUCCH only
Part I CSI feedback only
Specific set of CSI reporting parameters only
Type I PMI codebook only
Wideband CSI feedback only
CRI only, CRI/RSRP, SSBRI/RSRP
Up to a limited maximum rank (e.g., RI≤2) or rank-restricted CSI feedback (e.g., RI=1)
Number of CSI-RS antenna ports <X, where X is an integer Alternatively, only in the case of periodic CSI reporting, CSI reporting for the inactive DL BWP may be allowed when at least one of the above exemplary conditions is met.

Alternatively, only in the case of periodic CSI reporting and semi-persistent CSI reporting on the PUCCH, CSI reporting for the inactive DL BWP may be allowed when at least one of the exemplary conditions is met.

In applying the above-described method 2 to PUCCH-based periodic/semi-persistent (/aperiodic) CSI reporting, even when UL BWP switching occurs in the middle, CSI reporting may not be affected. Since PUCCH resources for a plurality of UL BWPs may be separately set, the UE may select a PUCCH resource in the activated UL BWP at a corresponding reporting time and perform CSI reporting on the corresponding PUCCH resource.

The above-described method 2 may also be applied to PUSCH-based semi-persistent or aperiodic CSI reporting. In this case, regardless of whether the DL BWP is activated or deactivated, CSI reporting for the CSI-RS of the corresponding DL BWP may be performed aperiodically or semi-persistently through the scheduled PUSCH resource.

<Method 3>

In addition to the method of always performing CSI measurement and/or CSI reporting for the above-described specific CSI-RS or related CSI reporting, another method may be considered that, after setting a measurement gap independently from the CSI setting, determines whether to perform measurement of the CSI-RS and/or CSI reporting depending on whether the measurement gap includes the corresponding CSI-RS. This method provides more flexibility by controlling to allow the measurement gap to overlap the CSI-RS position in any one periodicity of periodic, semi-persistent, or aperiodic if reception of the CSI reporting of a specific BWP is desired or otherwise, not overlap, depending on the base station's need regardless of whether the BWP is active or inactive.

The UE may be operated to perform CSI-RS measurement (and related CSI reporting) if the DL BWP is inactive but included in a measurement gap (separately set) at the time of CSI-RS transmission for a (specific) CSI-RS (designated by the base station), whereas not to perform CSI-RS measurement (and related CSI reporting) if the DL BWP is inactive but is not included in a measurement gap (separately set).

The measurement gap may be set to one of periodic, semi-persistent, and aperiodic.

If CSI reporting for a plurality of BWPs is set (via RRC), the UE may report only CSI corresponding to CSI-RS included in the measurement gap for CSI-RS resources corresponding to each reporting timing. The CSI corresponding to the CSI-RS not included in the measurement gap may not be reported, or the previously reported CSI may be retransmitted. The 'CSI-RS resource corresponding to the reporting timing' may be a CSI-RS resource corresponding to a CSI reference signal resource for the corresponding CSI reporting. The CSI reporting configuration for the plurality of BWPs may be configured by connecting CSI-RS resources transmitted in the plurality of BWPs to a single CSI reporting setting, or by bundling a plurality of CSI reporting settings corresponding to different DL BWPs. The above two schemes may be applied to both PUCCH and PUSCH-based CSI reporting.

In the above operation, when the amount of CSI to be reported at a specific time exceeds the maximum amount of information that may be transmitted on the corresponding uplink channel, specific CSI reporting may be omitted from transmission according to a preset or prespecified priority rule. As an example, CSI for a specific DL BWP may be omitted according to a priority rule between DL BWPs.

Or/and, when other available uplink channels (e.g., (SPS) PUSCH available for PUCCH-based CSI reporting, PUCCH resources separately set for multi-CSI, etc.) are present/set/indicated, CSI information may be piggy-backed and transmitted through the corresponding uplink channel. In the above operation, when the number of CSI processing units required for CSI to be calculated and reported at a specific time is greater than the number of CSI processing units available to the UE at that time (that is, the number of CSIs that may be simultaneously calculated), it is possible to transmit without updating a specific CSI according to the preset or prespecified priority rule. For example, the CSI for a specific DL BWP may not be updated according to the priority rule between DL BWPs.

For the above-described CSI reporting indication for a plurality of DL BWPs, a method of activating/deactivating/triggering a plurality of CSI reporting settings in bundle may be taken into account. Since the NR standard sets the DL BWP information in units of settings, this method may be understood as a method of linking reporting settings having a plurality of different DL BWPs with one report setting. However, this is merely an example to which the disclosure may be applied, and does not limit the scope of the disclosure. Accordingly, changes may be made thereto so that the DL BWP IDs are set in resource set units or resource units.

The CSI reporting methods proposed in the disclosure may be applied to various feedback methods, not only for information necessary for MIMO precoding and link adaptation (e.g., PMI, CQI, RI, etc.) but also for beam information (e.g., CRI, SSBRI, RSRP, RSRQ, SINR), new channel information (e.g., covariance matrix feedback, best layer indication), and higher layer measurement information for radio resource management (e.g., L3 RSRP/RSRQ/RSSI). Further, the proposed methods may be applicable when the 'no report' method introduced in the NR system, i.e., the UE reports nothing but performs measurement alone based on CSI-RS (e.g., time/frequency tracking reference signal or CSI-RS for UE RX beam selection). Specifically, when it is desired to previously perform time/frequency tracking or optimize the UE RX beam for the corresponding BWP before switching a specific inactive DL BWP to an active BWP, the above-described methods may be used to perform downlink reference signal measurement on the corresponding DL BWP without switching to the active BWP (via the CSI reporting set to "reporting quantity='none'").

FIG. 10 is a flowchart illustrating operations of a UE performing CSI reporting, to which a method as proposed in the disclosure may apply. FIG. 10 is intended merely for illustration purposes but not for limiting the scope of the disclosure.

Referring to FIG. 10, the UE and/or base station are assumed to operate based on methods 1 to 3 and/or embodiments described above. Some of the steps described in FIG. 10 may be combined or omitted. Further, in performing the procedures described below, the CSI-related operations of FIG. 8 may be considered/applied. Further, it is assumed that a plurality of BWPs are configured in the UE and that the plurality of BWPs include an activated BWP (e.g., a first BWP) and a deactivated BWP (e.g., a second BWP). Hereinafter, for convenience of description, the activated BWP and the deactivated BWP are referred to as a first BWP and a second BWP, respectively. However, this is solely for ease of description, the disclosure is not limited thereto, and it is apparent that the first BWP and the second BWP may be substituted or replaced.

The UE may receive information related to CSI for the second BWP (e.g., inactive BWP) from the base station (S1010). In this case, the information may be received in the first BWP (e.g., active BWP). For example, the information related to CSI for the second BWP (e.g., inactive BWP) may include information based on the above-described methods 1 to 3.

As a specific example, the information related to CSI for the second BWP (e.g., inactive BWP) may be received through DCI (e.g., the CSI request field in the DCI) or MAC-CE (e.g., the CSI reporting activation message in the MAC-CE) that triggers/activates semi-persistent or aperiodic CSI reporting for the first BWP. Alternatively, it may be included in a resource set/setting or a reporting setting, and received.

In the case where the information related to the CSI for the second BWP (e.g., inactive BWP) is included in the report setting and received, CSI reporting for the inactive DL BWP may be limitedly allowed only when meeting at least one of: short PUCCH-based CSI reporting only; part I CSI feedback only; specific set of CSI reporting parameters only; type I PMI codebook only; wideband CSI feedback only; CRI only, CRI/RSRP, SSBRI/RSRP feedback; up to a limited maximum rank (e.g., RI≤2) or rank-restricted CSI feedback (e.g., RI=1); and number of CSI-RS antenna ports <X.

Further, the information related to the CSI for the second BWP (e.g., inactive BWP) may include information indicating at least one of CSI measurement and CSI reporting for the second BWP. Alternatively, the information related to the CSI for the second BWP (e.g., inactive BWP) may include indication information as to whether to always perform CSI measurement and/or CSI reporting on all of the plurality of BWPs regardless of whether the BWP where the CSI-RS is received is active or inactive or whether to perform CSI measurement and/or CSI reporting only when the BWP is an active BWP (e.g., the first BWP). Here, an indicator indicating CSI measurement and an indicator indicating CSI reporting may independently exist.

The UE may receive information related to a measurement gap from the base station (S1015). This step may be omitted in some cases. The information related to the measurement gap may include information on the measurement gap configuration described above in connection with methods 1 to 3.

For example, the measurement gap may be set to one of periodic, semi-persistent, and aperiodic. Further, the information related to the measurement gap may include a start timing, a duration, and a periodicity of the measurement gap. Alternatively, the information may include an implicit instruction to set according to the transmission timing, duration, and periodicity of the set/indicated reference signal (e.g., CSI-RS). If CSI reporting for a plurality of CSI-RS resources is indicated, or if a plurality of CSI reports are indicated, the information may include an instruction to set considering the transmission timing, duration, and periodicity of the plurality of CSI-RS resources to be measured.

As a specific example, the periodicity of the measurement gap may be set as the shortest period, longest period, greatest common divisor, or least common multiple of the periods of the plurality of CSI-RS resources. The start timing of the measurement gap may be set according to the earliest CSI-RS (e.g., the first symbol of the earliest CSI-RS resource) (in the corresponding periodicity). In this case, given the RF tuning time, the measurement gap may be set from a time earlier than the aforementioned timing. The end timing of the measurement gap may be set according to the latest CSI-RS (e.g., the last symbol of the lastCSI-RS resource) (in the corresponding periodicity). In this case, given the RF tuning time, the measurement gap may be set to be terminated a predetermined time later than the aforementioned timing. The start and end timings of the measurement gap may be set according to the latest CSI-RS (e.g., the last symbol of the lastCSI-RS resource) (in the corresponding periodicity). In this case, given the RF tuning time, the measurement gap may be set to be terminated a predetermined time later than the aforementioned timing.

As another specific example, a measurement gap may be limitedly set in a situation where all CSI-RS resources are transmitted in N consecutive slots. Alternatively, the union of predetermined periods of time, symbols, or slots before and after each CSI-RS resource may be set as a measurement gap. Also possible is a method in which the base station indicates the CSI-RS resource which serves as a reference for the measurement gap.

The measurement gap-related information may be received via two-step (e.g., RRC and MAC-CE), or multi-step (e.g., RRC, MAC-CE, and DCI) signaling. For example, a plurality of candidate measurement gap configurations may be received via RRC, and one of the candidates to be actually applied may be received via MAC-CE and/or DCI.

Further, a measurement gap may be automatically set if the BWP where the corresponding CSI-RS is transmitted at each CSI-RS transmission time while no measurement gap is set if the BWP is an active BWP. Or, a periodic measurement gap may be instructed to be always set regardless of whether the BWP is active/inactive. Alternatively, if the base station wants to receive the CSI reporting, the measurement gap may be instructed to overlap the corresponding CSI-RS location, otherwise the measurement gap may be instructed not to overlap. The indication information may be included in information related to the measurement gap.

The UE may receive a reference signal from the base station in the second BWP (S1020). The reference signal may correspond to the CSI-RS for channel measurement. Alternatively, the reference signal may correspond to CSI-IM as an interference measurement resource or SSB as a downlink measurement reference signal resource for downlink beam management.

The UE may perform measurement based on the received reference signal (S1030). When receiving the information related to the measurement gap in step S1015, the UE may set a measurement gap based on the information and perform measurement.

As an example, an aperiodic measurement gap, as set, may be maintained for a certain period of time (duration) from a predetermined time (start timing) after the time when the UE receives the CSI measurement indication (or the time of transmission of an ACK signal for the CSI measurement indication to the base station) and then terminate.

As another example, a semi-persistent measurement gap, as set, may last for a certain period of time (duration), from a predetermined time (start timing) after the time when the UE receives the CSI measurement indication (or the time of transmission of an ACK signal for the CSI measurement indication to the base station) and then terminates, then a measurement gap may be set again every certain period (periodicity).

As another example, measurement may be performed only when the measurement gap set based on the measurement gap setting information and the second BWP overlap.

Measurement may also be performed without setting a measurement gap.

The UE may transmit the CSI obtained (generated) based on the measurement to the base station (S1040). In this case, the transmission may be performed in the first BWP (e.g., active BWP). The reporting periodicity of the CSI may correspond to any one of periodic, aperiodic, or semi-permanent.

As an example, when the amount of CSI to be reported exceeds the maximum amount of information that may be transmitted on the corresponding uplink channel, specific CSI reporting may be omitted from transmission according to a preset or prespecified priority rule. As a specific example, CSI for a specific DL BWP may be omitted according to a priority rule between DL BWPs. Or, when other available uplink channels (e.g., (SPS) PUSCH available for PUCCH-based CSI reporting or PUCCH resources separately set for multi-CSI, etc.) are set, CSI information may be piggy-backed and transmitted through the corresponding uplink channel.

Further, when the number of CSI processing units required for CSI to be calculated and reported at a specific time is greater than the number of CSI processing units available to the UE at that time (that is, the number of CSIs that may be simultaneously calculated), it is possible to transmit without updating a specific CSI according to the preset or prespecified priority rule. As a specific example, the CSI for a specific DL BWP may not be updated according to the priority rule between DL BWPs.

FIG. 11 is a flowchart illustrating operations of abase station performing CSI reporting, to which a method as proposed in the disclosure may apply. FIG. 11 is intended merely for illustration purposes but not for limiting the scope of the disclosure.

Referring to FIG. 11, the UE and/or base station are assumed to operate based on methods 1 to 3 and/or embodiments described above. Some of the steps described in FIG. 11 may be combined or omitted. Further, in performing the procedures described below, the CSI-related operations of FIG. 8 may be considered/applied. Further, it is assumed that a plurality of BWPs are configured in the UE and that the plurality of BWPs include an activated BWP and a deactivated BWP. Hereinafter, for convenience of description, the activated BWP and the deactivated BWP are referred to as a first BWP and a second BWP, respectively. However, this is solely for ease of description, the disclosure is not limited thereto, and it is apparent that the first BWP and the second BWP may be substituted or replaced.

The base station may transmit information related to CSI for the second BWP (e.g., inactive BWP) to the UE (S1110). In this case, the information may be transmitted via the first BWP (e.g., activated BWP). For example, the information related to CSI for the second BWP (e.g., inactive BWP) may include information based on the above-described methods 1 to 3.

As a specific example, the base station may transmit the information related to CSI for the second BWP (e.g., inactive BWP) through DCI (e.g., the CSI request field in the DCI) or MAC-CE (e.g., the CSI reporting activation message in the MAC-CE) that triggers/activates semi-persistent or aperiodic CSI reporting for the first BWP. Alternatively, it may be included in a resource set/setting or a reporting setting, and transmitted.

In the case where the information related to the CSI for the second BWP (e.g., inactive BWP) is included in the report setting and transmitted, CSI reporting for the inactive DL BWP may be limitedly allowed only when meeting at least one of: short PUCCH-based CSI reporting only; part I CSI feedback only; specific set of CSI reporting parameters only; type I PMI codebook only; wideband CSI feedback only; CRI only, CRI/RSRP, SSBRI/RSRP feedback; up to a limited maximum rank (e.g., RI≤2) or rank-restricted CSI feedback (e.g., RI=1); and number of CSI-RS antenna ports <X.

Further, the information related to the CSI for the second BWP (e.g., inactive BWP) may include information indicating at least one of CSI measurement and CSI reporting for the second BWP. Alternatively, the information related to the CSI for the second BWP (e.g., inactive BWP) may include indication information as to whether to always perform CSI measurement and/or CSI reporting on all of the plurality of BWPs regardless of whether the BWP where the CSI-RS is received is active or inactive or whether to perform CSI measurement and/or CSI reporting only when the BWP is an active BWP (e.g., the first BWP). Here, an indicator indicating CSI measurement and an indicator indicating CSI reporting may independently exist.

The base station may transmit information related to a measurement gap to the UE (S1115). This step may be omitted in some cases. The information related to the measurement gap may include information on the measurement gap configuration described above in connection with methods 1 to 3.

For example, the measurement gap may be set to one of periodic, semi-persistent, and aperiodic. Further, the information related to the measurement gap may include a start timing, a duration, and a periodicity of the measurement gap. Alternatively, the information may include an implicit instruction to set according to the transmission timing, duration, and periodicity of the set/indicated reference signal (e.g., CSI-RS). If CSI reporting for a plurality of CSI-RS resources is indicated, or if a plurality of CSI reports are indicated, the information may include an instruction to set considering the transmission timing, duration, and periodicity of the plurality of CSI-RS resources to be measured.

As a specific example, the periodicity of the measurement gap may be set as the shortest period, longest period, greatest common divisor, or least common multiple of the periods of the plurality of CSI-RS resources. The start timing of the measurement gap may be set according to the earliest CSI-RS (e.g., the first symbol of the earliest CSI-RS resource) (in the corresponding periodicity). In this case, given the RF tuning time, the measurement gap may be set from a time earlier than the aforementioned timing. The end timing of the measurement gap may be set according to the latest CSI-RS (e.g., the last symbol of the lastCSI-RS resource) (in the corresponding periodicity). In this case, given the RF tuning time, the measurement gap may be set to be terminated a predetermined time later than the aforementioned timing. The start and end timings of the measurement gap may be set according to the latest CSI-RS (e.g., the last symbol of the lastCSI-RS resource) (in the corresponding periodicity). In this case, given the RF tuning time, the measurement gap may be set to be terminated a predetermined time later than the aforementioned timing.

As another specific example, a measurement gap may be limitedly set in a situation where all CSI-RS resources are transmitted in N consecutive slots. Alternatively, the union of predetermined periods of time, symbols, or slots before and after each CSI-RS resource may be set as a measurement gap. Alternatively, the base station may indicate a CSI-RS resource that is a reference of the measurement gap.

The base station may transmit the measurement gap-related information via two-step (e.g., RRC and MAC-CE), or multi-step (e.g., RRC, MAC-CE, and DCI) signaling. For example, a plurality of candidate measurement gap configurations may be transmitted via RRC, and one of the candidates to be actually applied may be transmitted via MAC-CE and/or DCI.

Further, a measurement gap may be automatically set if the BWP where the corresponding CSI-RS is transmitted at each CSI-RS transmission time while no measurement gap is set if the BWP is an active BWP. Or, a periodic measurement gap may be instructed to be always set regardless of whether the BWP is active/inactive. Alternatively, if the base station wants to receive the CSI reporting, the measurement gap may be instructed to overlap the corresponding CSI-RS location, otherwise the measurement gap may be instructed not to overlap. Measurement may be configured to be performed only when the measurement gap set based on the measurement gap setting information and the second BWP overlap. The indication information may be included in information related to the measurement gap.

The base station may transmit a reference signal to the UE via the second BWP (S1120). The reference signal may correspond to the CSI-RS for channel measurement. Alternatively, the reference signal may correspond to CSI-IM as an interference measurement resource or SSB as a downlink measurement reference signal resource for downlink beam management.

The base station may receive the CSI measured based on the reference signal from the UE (S1130). In this case, the CSI may be received via the first BWP (e.g., activated BWP). The base station may receive CSI reporting in any one scheme of periodic, aperiodic, or semi-persistent.

Overview of Devices to which Disclosure is Applicable

FIG. 12 illustrates an example of a block diagram of a wireless communication device to which methods proposed in the disclosure may be applied.

Referring to FIG. 12, a wireless communication system may include a first device 1210 and a second device 1220.

The first device 1210 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

The second device 1220 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 1210 may include at least one processor, such as a processor 1211, at least one memory, such as a memory 1212, and at least one transceiver, such as a transceiver 1213. The processor 1211 may perform the functions, procedures, and/or methods described above. The processor 1211 may perform one or more protocols. The processor 1211 may perform one or more layers of a radio interface protocol. The memory 1212 may be connected to the processor 1211 and store various types of information and/or commands. The transceiver 1213 may be connected to the processor 1211 and controlled to transmit/receive a radio signal.

As a specific example, the processor 1211 may control the transceiver 1213 to transmit information related to CSI for an inactive BWP (e.g., the second BWP) to the second device 1220 (S1110). Further, the processor 1211 may control the transceiver 1213 to transmit information related to a measurement gap from the second device 1220 (S1115). Further, the processor 1211 may control the transceiver 1213 to transmit a reference signal to the second device 1220 (S1120). Further, the processor 1211 may control the transceiver 1213 to receive CSI from the second device 1220.

The second device 1220 may include at least one processor, such as a processor 1221, at least one memory, such as a memory 1222, and at least one transceiver, such as a transceiver 1223. The processor 1221 may perform the functions, procedures, and/or methods described above. The processor 1221 may implement one or more protocols. For example, the processor 1221 may implement one or more layers of the radio interface protocol. The memory 1222 may be connected to the processor 1221 and store various types of information and/or commands. The transceiver 1223 may be connected to the processor 1221 and controlled to transmit/receive a radio signal.

As a specific example, the processor 1221 may control the transceiver 1223 to receive information related to CSI for an inactive BWP (e.g., the second BWP) from the first device 1210 (S1010). Further, the processor 1221 may control the transceiver 1223 to receive information related to a measurement gap from the first device 1210 (S1015). The processor 1221 may control the transceiver 1223 to receive a reference signal from the first device 1210 (S1020). Further, the processor 1221 may perform measurement based on the received reference signal (S1030). Further, the processor 1221 may control the transceiver 1223 to transmit CSI to the first device 1210 (S1040).

FIG. 13 illustrates another example of the block diagram of the wireless communication device to which the methods proposed in this disclosure may be applied.

Referring to FIG. 13, a wireless communication system includes an eNB 1310 and multiple user equipments 1320 positioned within an area of the eNB. The eNB may be represented by a transmitting apparatus and the UE may be represented by a receiving apparatus, or vice versa. The eNB and the UE include processors (1311,1321), memories (1314,1324), one or more Tx/Rx radio frequency (RF) modules (1315,1325), Tx processors (1312,1322), Rx processors (1313, 1323) and antennas (1316, 1326). The processor implements a function, a process, and/or a method which are described above. More specifically, a higher layer packet from a core network is provided to the processor 1311 in DL (communication from the eNB to the UE). The processor implements a function of an L2 layer. In the DL, the processor provides multiplexing between a logical channel and a transmission channel and allocation of radio resources to the UE 1320, and takes charge of signaling to the UE. The transmit (TX) processor 1312 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1316 via individual Tx/Rx modules (or transceivers, 1315). Each Tx/Rx module may modulate an RF carrier into each spatial stream for transmission. In the UE, each Tx/Rx module (or transceiver, 1325) receives a signal through each antenna 1326 of each Tx/Rx module. Each Tx/Rx module reconstructs information modulated with the RF carrier and provides the reconstructed information to the receive (RX) processor 1323. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 1321.

UL (communication from the UE to the eNB) is processed by the eNB 1310 in a scheme similar to a scheme described in association with a receiver function in the UE 1320. Each Tx/Rx module 1325 receives the signal through each antenna 1326. Each Tx/Rx module provides the RF carrier and information to the RX processor 1323. The processor 1321 may be associated with the memory 1324 storing a program code and data. The memory may be referred to as a computer readable medium.

FIG. 14 illustrates an AI device 100 according to an embodiment of the disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 14, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as abase for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 15 illustrates an AI server 200 according to an embodiment of the disclosure.

Referring to FIG. 15, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 16 illustrates an AI system 1 according to an embodiment of the disclosure.

Referring to FIG. 16, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 16 may be considered to be detailed embodiments of the AI device 100 shown in FIG. 14.

<AI and Robot to which the Methods Proposed in this Disclosure May be Applied>

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100*a* may obtain state information of the robot 100*a*, may detect (recognize) a surrounding environment and object, may generate map data, may determine a moving path and a running plan, may determine a response to a user interaction, or may determine an operation using sensor information obtained from various types of sensors.

In this case, the robot 100*a* may use sensor information obtained by at least one sensor among LIDAR, a radar, and a camera in order to determine the moving path and running plan.

The robot 100*a* may perform the above operations using a learning model configured with at least one artificial neural network. For example, the robot 100*a* may recognize a surrounding environment and object using a learning model, and may determine an operation using recognized surrounding environment information or object information. In this case, the learning model may have been directly trained in the robot 100*a* or may have been trained in an external device, such as the AI server 200.

In this case, the robot 100*a* may directly generate results using the learning model and perform an operation, but may perform an operation by transmitting sensor information to an external device, such as the AI server 200, and receiving results generated in response thereto.

The robot 100*a* may determine a moving path and running plan using at least one of map data, object information detected from sensor information, or object information obtained from an external device. The robot 100*a* may run along the determined moving path and running plan by controlling the driving unit.

The map data may include object identification information for various objects disposed in the space in which the robot 100*a* moves. For example, the map data may include object identification information for fixed objects, such as a wall and a door, and movable objects, such as a flowport and a desk. Furthermore, the object identification information may include a name, a type, a distance, a location, etc.

Furthermore, the robot 100*a* may perform an operation or run by controlling the driving unit based on a user's control/interaction. In this case, the robot 100*a* may obtain intention information of an interaction according to a user's behavior or voice speaking, may determine a response based on the obtained intention information, and may perform an operation.

<AI and Self-Driving to which the Methods Proposed in this Disclosure May be Applied>

An AI technology is applied to the self-driving vehicle 100*b*, and the self-driving vehicle 100*b* may be implemented as a movable type robot, a vehicle, an unmanned flight body, etc.

The self-driving vehicle 100*b* may include a self-driving control module for controlling a self-driving function. The self-driving control module may mean a software module or a chip in which a software module has been implemented using hardware. The self-driving control module may be included in the self-driving vehicle 100*b* as an element of the self-driving vehicle 100*b*, but may be configured as separate hardware outside the self-driving vehicle 100*b* and connected to the self-driving vehicle 100*b*.

The self-driving vehicle 100*b* may obtain state information of the self-driving vehicle 100*b*, may detect (recognize) a surrounding environment and object, may generate map data, may determine a moving path and running plan, or may determine an operation using sensor information obtained from various types of sensors.

In this case, in order to determine the moving path and running plan, like the robot 100*a*, the self-driving vehicle 100*b* may use sensor information obtained from at least one sensor among LIDAR, a radar and a camera.

Particularly, the self-driving vehicle 100*b* may recognize an environment or object in an area whose view is blocked or an area of a given distance or more by receiving sensor information for the environment or object from external devices, or may directly receive recognized information for the environment or object from external devices.

The self-driving vehicle 100*b* may perform the above operations using a learning model configured with at least one artificial neural network. For example, the self-driving vehicle 100*b* may recognize a surrounding environment and object using a learning model, and may determine the flow of running using recognized surrounding environment information or object information. In this case, the learning model may have been directly trained in the self-driving vehicle 100*b* or may have been trained in an external device, such as the AI server 200.

In this case, the self-driving vehicle 100*b* may directly generate results using the learning model and perform an operation, but may perform an operation by transmitting sensor information to an external device, such as the AI server 200, and receiving results generated in response thereto.

The self-driving vehicle 100*b* may determine a moving path and running plan using at least one of map data, object information detected from sensor information or object information obtained from an external device. The self-driving vehicle 100*b* may run based on the determined moving path and running plan by controlling the driving unit.

The map data may include object identification information for various objects disposed in the space (e.g., road) in which the self-driving vehicle 100*b* runs. For example, the map data may include object identification information for fixed objects, such as a streetlight, a rock, and a building, etc., and movable objects, such as a vehicle and a pedestrian.

Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI and XR to which the Methods Proposed in this Disclosure May be Applied>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

<AI, Robot and Self-Driving to which the Methods Proposed in this Disclosure May be Applied>

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

<AI, Robot and XR to which the Methods Proposed in this Disclosure May be Applied>

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

<AI, Self-Driving and XR to which the Methods Proposed in this Disclosure May be Applied>

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for transmitting channel state information in a wireless communication system of the disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method for reporting channel state information (CSI) by a user equipment (UE) in a wireless communication system, wherein a plurality of BWPs is configured to the UE, and the plurality of bandwidth parts (BWPs) includes an activated first BWP and a deactivated second BWP, the method comprising:
receiving, from a base station, information related to the CSI for the second BWP in the first BWP,
wherein the information related to the CSI for the second BWP is included in a reporting setting configured as one reporting setting obtained by combining respective reporting settings of the plurality of BWPs;
receiving, from the base station, a reference signal in the second BWP;
performing measurement based on the reference signal; and
transmitting, to the base station, the CSI obtained based on the measurement in the first BWP.

2. The method of claim 1, wherein when a reporting periodicity of the CSI is set to aperiodic or semi-persistent, the information related to the CSI for the second BWP is included in any one of an MAC-CE or DCI triggering CSI reporting in the first BWP.

3. The method of claim 1, wherein the information related to the CSI for the second BWP includes information indicating one of i) CSI measurement on all of the plurality of BWPs or 2) CSI measurement on the activated first BWP.

4. The method of claim 1, wherein the information related to the CSI for the second BWP includes information indicating at least one of CSI measurement and CSI reporting.

5. The method of claim 4, wherein an indicator for the CSI measurement and an indicator for the CSI reporting exist independently from each other.

6. The method of claim 1, further comprising receiving information related to a measurement gap from the base station.

7. The method of claim 6, wherein the information related to the measurement gap includes information for a start timing, duration, and periodicity of a measurement gap.

8. The method of claim 6, wherein the measurement is performed only when the reference signal is received in a region where a measurement gap set based on the information related to the measurement gap overlaps the second BWP.

9. The method of claim 6, wherein a measurement gap set based on the information related to the measurement gap is set to any one periodicity of periodic, aperiodic, or semi-persistent.

10. A user equipment (UE) reporting channel state information (CSI) in a wireless communication system, wherein a plurality of BWPs is configured to the UE, and the plurality of bandwidth parts (BWPs) includes an activated first BWP and a deactivated second BWP, the UE comprising:
  a transceiver for transmitting or receiving a radio signal; and
  a processor functionally connected with the transceiver, wherein the processor:
  controls the transceiver to receive, from a base station, information related to the CSI for the second BWP in the first BWP,
  wherein the information related to the CSI for the second BWP is included in a reporting setting configured as one reporting setting obtained by combining respective reporting settings of the plurality of BWPs;
  controls the transceiver to receive, from the base station, a reference signal in the second BWP;
  performs measurement based on the reference signal; and
  controls the transceiver to transmit, to the base station, CSI obtained based on the measurement in the first BWP.

11. The UE of claim 10, wherein when a reporting periodicity of the CSI is set to aperiodic or semi-persistent, the information related to the CSI for the second BWP is included in any one of an MAC-CE or DCI triggering CSI reporting in the first BWP.

12. The UE of claim 10, wherein the information related to the CSI for the second BWP includes information indicating at least one of CSI measurement and CSI reporting.

13. A base station receiving channel state information (CSI) in a wireless communication system, the base station comprising:
  a transceiver for transmitting or receiving a wireless signal; and
  a processor functionally connected with the transceiver, wherein the processor:
  configures a plurality of bandwidth parts (BWPs) to a UE, the plurality of BWPs including an activated first BWP and a deactivated second BWP,
  wherein the information related to the CSI for the second BWP is included in a reporting setting configured as one reporting setting obtained by combining respective reporting settings of the plurality of BWPs;
  controls the transceiver to transmit, to the UE, information related to the CSI for the second BWP in the first BWP;
  controls the transceiver to transmit, to the UE, a reference signal in the second BWP; and
  controls the transceiver to receive, from the UE, CSI obtained based on the reference signal in the first BWP.

* * * * *